US008264705B2

(12) United States Patent
Takei

(10) Patent No.: US 8,264,705 B2
(45) Date of Patent: Sep. 11, 2012

(54) IMAGE READING APPARATUS, IMAGE FORMING APPARATUS AND COMPUTER READABLE INFORMATION RECORDING MEDIUM

(75) Inventor: Kazushi Takei, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 928 days.

(21) Appl. No.: 12/289,832

(22) Filed: Nov. 5, 2008

(65) Prior Publication Data
US 2009/0128854 A1  May 21, 2009

(30) Foreign Application Priority Data

Nov. 7, 2007  (JP) ................................ 2007-289992
Oct. 31, 2008  (JP) ................................ 2008-282104

(51) Int. Cl.
G06F 15/00  (2006.01)
H04N 1/04  (2006.01)

(52) U.S. Cl. ....... 358/1.14; 358/401; 358/462; 358/465; 358/474; 358/501

(58) Field of Classification Search ................ 358/1.14, 358/401, 462, 465, 474, 501, 505, 514, 540
See application file for complete search history.

(56) References Cited

U.S. PATENT DOCUMENTS 4,827,350 A * 5/1989 Kobayashi et al. ........... 358/494
4,974,072 A * 11/1990 Hasegawa ..................... 358/514
5,023,711 A * 6/1991 Erhardt ......................... 358/506
5,929,417 A * 7/1999 Hayashi et al. ............... 235/454
6,671,421 B1 * 12/2003 Ogata et al. ................... 382/284
2007/0206244 A1 * 9/2007 Kobayashi .................... 358/514

FOREIGN PATENT DOCUMENTS

| JP | 10-233900 | 9/1998 |
| JP | 2003-046736 | 2/2003 |
| JP | 2004-214769 | 7/2004 |
| JP | 2004-215011 | 7/2004 |
| JP | 2006-067031 | 3/2006 |
| JP | 2006-166106 | 6/2006 |
| JP | 2007-336440 | 2/2007 |
| JP | 2007-150870 | 6/2007 |
| JP | 2008-022062 | 1/2008 |
| WO | WO 2006/061941 | 6/2006 |

OTHER PUBLICATIONS

Office Action dated Jun. 5, 2012 issued in corresponding Japanese Application No. 2008-282104.

* cited by examiner

*Primary Examiner* — King Poon
*Assistant Examiner* — Allen H Nguyen
(74) *Attorney, Agent, or Firm* — Harness, Dickey & Pierce, PLC

(57) ABSTRACT

A first part calculates corrected image data for each pixel in the range in which the reading parts of the adjacent image sensors overlaps in the main scan direction, for correcting the image data for a position shift less than an amount corresponding to one pixel in the main scan direction of the image sensors. A correcting method is determined in such a manner that a position shift amount to be corrected increases in a step-by-step manner as moving from a base portion to an end portion in the range in which the adjacent image sensors overlap in the main scan direction. A second part multiplies the image data corrected by the thus-determined correcting method by a weighting factor determined according to a position in the main scan direction in the adjacent image sensors.

12 Claims, 32 Drawing Sheets $$\sigma = \frac{S_{i-1}*h(1+r)+S_i*h(r)+S_{i+1}*h(1-r)+S_{i+2}*h(2-r)}{h(1+r)+h(r)+h(1-r)+h(2-r)}$$

- S : TONE OF INPUT PIXEL
- h( ) : CORRECTING COEFFICIENT FOR CALCULATION
- σ : TONE OF EXPECTED PIXEL

FIG.5

| r (CODE) | | h(1+r) | h(r) | h(1−r) | h(2−r) |
|---|---|---|---|---|---|
| DECIMAL EXPRESSION | BINARY EXPRESSION | | | | |
| 0 | 000 | 0 | 1 | 0 | 0 |
| 1 | 001 | −6/64 | 62/64 | 9/64 | −1/64 |
| 2 | 010 | −9/64 | 57/64 | 19/64 | −3/64 |
| 3 | 011 | −9/64 | 49/64 | 30/64 | −6/64 |
| 4 | 100 | −8/64 | 40/64 | 40/64 | −8/64 |
| 5 | 101 | −6/64 | 30/64 | 49/64 | −9/64 |
| 6 | 110 | −3/64 | 19/64 | 57/64 | −9/64 |
| 7 | 111 | −1/64 | 9/64 | 62/64 | −6/64 |

FIG.16

| MAIN SCAN DIRECTION SHIFT AMOUNT | CIS | CORRECTING COEFFICIENT |
|---|---|---|
| ±1/8 | 151 | (r0, r0, r0, r0, r1, r1, r1, r1) |
| | 152 | (r1, r1, r1, r1, r0, r0, r0, r0) |
| ±2/8 | 151 | (r0, r0, r1, r1, r1, r1, r2, r2) |
| | 152 | (r2, r2, r1, r1, r1, r1, r0, r0) |
| ±3/8 | 151 | (r0, r0, r1, r1, r2, r2, r3, r3) |
| | 152 | (r3, r3, r2, r2, r1, r1, r0, r0) |
| ±4/8 | 151 | (r0, r1, r1, r2, r2, r3, r3, r4) |
| | 152 | (r4, r3, r3, r2, r2, r1, r1, r0) |
| ±5/8 | 151 | (r0, r1, r2, r2, r3, r3, r4, r5) |
| | 152 | (r5, r4, r3, r3, r2, r2, r1, r0) |
| ±6/8 | 151 | (r0, r1, r2, r3, r3, r4, r5, r6) |
| | 152 | (r6, r5, r4, r3, r3, r2, r1, r0) |
| ±7/8 | 151 | (r0, r1, r2, r3, r4, r5, r6, r7) |
| | 152 | (r7, r6, r5, r4, r3, r2, r1, r0) |

: TARGET PIXEL

FIG.25

| CHANGING POINT THRESHOLD/ NUMBER OF PIXELS TO BE CHECKED | NUMBER OF LINES OF HALFTONE DOTS (ANGLE:45°) |
|---|---|
| 10/41 | MORE THAN 103 LINES |
| 11/41 | MORE THAN 114 LINES |
| 12/41 | MORE THAN 124 LINES | ated. Therefore, it may be difficult to obtain uniform tone output throughout the entirety of the original image.

IMAGE READING APPARATUS, IMAGE FORMING APPARATUS AND COMPUTER READABLE INFORMATION RECORDING MEDIUM

BACKGROUND OF THE INVENTION

1. Field of the Invention

The present invention relates to an image reading apparatus, an image forming apparatus and a computer readable information recording medium.

2. Description of the Related Art

In an image reading apparatus for reading an original image, in order to guarantee reading performance, shading correction, which is well-known technique, is carried out so that variation in image data in a main scan direction is corrected. In an image reading apparatus having a plurality of image sensors disposed in a staggering manner, output characteristics of the respective image sensors may have variations. Therefore, it may be difficult to obtain uniform tone output throughout the entirety of the original image.

Further, among the plurality of image sensors, image data read by the image sensor which reads the original image first is stored in a memory temporarily so that difference in reading timing between the image sensors which read the original image in different timing respectively is corrected.

However, position shifts in main and sub-scan directions may occur in reading the original image data because of possible shifts in timing of conveying the original document, disposition of the image sensors, and so forth.

The following patent documents 1-4 discuss arts for dealing with the issues:

Patent document 1: Japanese Laid-Open Patent Application No. 2004-215011

Patent document 2: Japanese Laid-Open Patent Application No. 2004-214769

Patent document 3: Japanese Laid-Open Patent Application No. 2003-046736

Patent document 4: Japanese Laid-Open Patent Application No. 2007-150870

According to the patent document 1, in a case where one sheet of an original document is read with the original document being divided by a plurality of pick-up devices in a main scan direction, a wide area is read with the image to be read being divided in the main scan direction, for the purpose of reducing relative shifts in thus-divided read images occurring from position difference of the pick-up devices in a sub-scan direction, That is, according to the patent document 1, the plurality of pick-up devices disposed in the main scan direction, a sub-scan part relatively driving at least one of the original image and the pick-up devices in the sub-scan direction, a speed detecting part detecting a speed in the sub-scan direction, a delay part correcting based on the detected speed a timing shift in image data between the pick-up devices because of position difference of reading viewing fields of the pick-up devices in the sub-scan direction, and a collecting part successively arranging the image data, thus corrected in the timing shifts, corresponding to an image distribution in the main scan direction, are provided.

According to the patent document 2, to precisely carry out connecting image data read by a plurality of reading sensors disposed to extend in a main scan direction in such a manner that ends of the reading sensors are overlapped one another by predetermined amounts, and the reading sensors are disposed with position difference, is directed to.

Thus, according to the patent document 2, an image pattern in a joint part (which may be referred to as an overlapped part, hereinafter) between image data read by adjacent reading sensors is recognized. Then, when the image pattern corresponds to a predetermined image pattern, a shift amount in a sub-scan direction of the respective image data read by the adjacent reading sensors is detected based on the image data in the overlapped part. The shift amount is stored. Based on the shift amount, a delay part corrects a delay time in the image data read by the upstream reading sensor in an original document conveyance direction.

According to the patent document 3, to avoid a boundary in tone or an image shift occurring at a joint part between respective sensors in an output image.

That is, according to the patent document 3, among the plurality of image sensors disposed in a staggering manner, image data of an image sensor disposed at one end in a sub-scan direction, which image data is not used for producing image data of the entirety of an original image, is stored. Based on the stored image data, image data of reading pixels of the image sensor which is disposed at the other end in the sub-scan direction and image data obtained from reading pixels at the overlapped part of the image sensor, are corrected.

SUMMARY OF THE INVENTION

An object of the present invention is to provide a configuration for effectively correcting for a position shift less than an amount of one pixel in a main scan direction of an image sensor, in an image reading apparatus having an image reading part having the image sensors disposed in such a manner that reading parts of adjacent ones of the image sensors overlap in a main scan direction each other by a predetermined number of pixels in a staggering manner; and a joint part correcting part configured to correct image data obtained from the reading parts of the image sensors in a range in which the reading parts of the adjacent image sensors overlap in the main scan direction.

According to the present invention, an image reading part having image sensors disposed in such a manner that reading parts of adjacent ones of the image sensors overlap in a main scan direction each other by a predetermined number of pixels in a staggering manner; and a joint part correcting part configured to correct image data obtained from the reading parts of the image sensors in a range in which the reading parts of the adjacent image sensors overlap in the main scan direction, are provided. The joint part correcting part has a first part configured to calculate corrected image data for each pixel in the range in which the reading parts of the adjacent image sensors overlap in the main scan direction, for correcting the image data for a position shift less than an amount corresponding to one pixel in the main scan direction of the image sensor, wherein a correcting method is determined in such a manner that a position shift amount to be corrected increases in a step-by-step manner as a position moves from a base portion to an end portion in the range in which the adjacent image sensors overlap in the main scan direction; a second part configured to multiply the image data corrected by the thus-determined correcting method by a weighting factor which is determined according to a position in the main scan direction in the adjacent image sensors; and a third part configured to add the image data obtained from the first part and the second part together between the adjacent image sensors for each corresponding pixel to generate image data of the range in which the adjacent image sensors overlap in the main scan direction.

Thereby, it is possible to provide a configuration for effectively correcting for a position shift less than an amount of one pixel in a main scan direction of an image sensor, in an image reading apparatus having an image reading part having the image sensors disposed in such a manner that reading parts of adjacent ones of the image sensor overlap in the main scan direction each other by a predetermined number of pixels in a staggering manner; and a joint part correcting part configured to correct image data obtained from the reading parts of the image sensors in a range in which the reading parts of the adjacent image sensors overlap in the main scan direction.

Other objects, features and advantages of the present invention will become more apparent from the following detailed description when read in conjunction with the accompanying drawings.

BRIEF DESCRIPTION OF THE DRAWINGS

FIG. 5 depicts a table for correcting coefficients;

FIG. 16 depicts a table for correcting coefficients with respect to main scan direction shift amounts;

FIG. 25 depicts a changing point threshold;

DESCRIPTION OF REFERENCE NUMERALS

Figure 1:
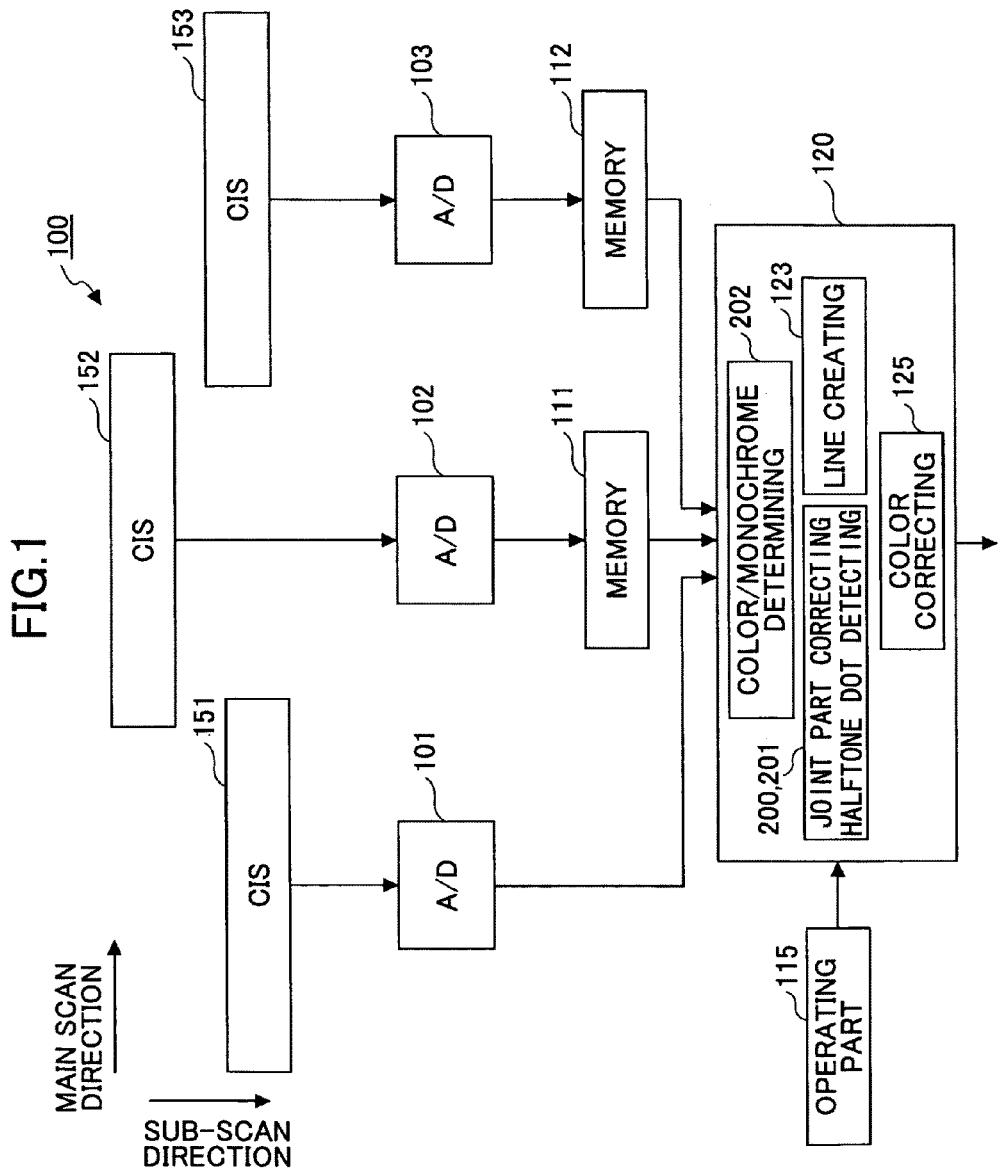
FIG. 1 depicts a block diagram of one embodiment of an image reading apparatus.

10 CPU
20 MEMORY
100 IMAGE READING APPARATUS
101, 102, 103 A/D CONVERTER
111, 112, 130 MEMORY
115 OPERATING PART
120 LINE COMBINING PART
123 LINE CREATING PART
125 COLOR CORRECTING PART
126 SHADING CORRECTING PART
151, 152, 153 IMAGE SENSOR (OR CIS)
200 JOINT PART CORRECTING CIRCUIT
201 HALFTONE DOT DETECTING CIRCUIT
202 COLOR/MONOCHROME DETERMINING PART
210 211, 212 WEIGHTING FACTOR PART
220, 221, 222 MULTIPLYING CIRCUIT
230, 231, 232 CUBIC CONVOLUTION PART
250 ADDING CIRCUIT

DETAILED DESCRIPTION OF THE PREFERRED EMBODIMENTS

In the arts disclosed by the above-mentioned patent documents 1-3, satisfactory performance may be expected for character images, drawn line images and uniform halftone images. However, when a position shift occurs in image sensors disposed in a staggering manner, or an image including halftone dots is processed, a tone may be reduced or characters or drawn lines become faint or patchy for the above-mentioned overlapped parts. Further, color which is not included in an original image may occur when a color image is processed.

For the purpose of dealing with the problems, in embodiments described below, when a joint part correcting process is carried out, different processes may be carried out between character images or halftone images and halftone dots. Thereby, tone reduction or becoming faint or patchy is avoided, and also, color more precisely identical to that of an original image can be reproduced.

According to an image data correcting method in an embodiment, a reading part in which adjacent image sensors are arranged in a staggering manner with the adjacent image sensors being overlapped by a predetermined number of pixels in a main scan direction, an obtaining part configured to obtain image data in overlapped parts of the respective adjacent image sensors, and a joint part correcting part configured to correct the image data obtained from the overlapped parts, are provided. In this method, when a position shift occurs in the image sensor, correcting coefficients according to an amount of the position shift are used to multiply the image data thus obtained by the obtaining part. Thereby, values of expected pixels are calculated in a first step. Then, in a second step, weighting factors according to positions of respective pixels in the main scan direction of the adjacent image sensors are used to multiply the corrected image data obtained from the first step. Then, in a third step, the corrected image data thus obtained from the second step are added together between the adjacent image sensors. Thereby, image data in the overlapped parts is obtained. In a fourth step, it is determined whether the image data thus read by means of the reading part is of a color image or of a monochrome image.

As the above-mentioned image sensors, CCD (Charge Coupled Device) for example may be used.

By using the above-mentioned image data correcting method, when a position shift of an image sensor occurs, the expected pixels are calculated according to the amount of the position shift, the weighting factors according to the positions of the respective pixels of the adjacent image sensors in the main scan direction are used to multiply the thus-obtained corrected image data, and the thus-obtained image data is added together between the adjacent image sensors so that image data at the overlapped parts can be obtained. Thereby, accuracy in correcting image data improves. As a result, an influence of the position shift of the image sensor in the image data at the overlapped part is reduced. Further, because in the fourth step it is determined whether the image data read by means of the image sensors is of a color image or of a monochrome image, the image data can be then suitably processed.

Further, in this image data correcting method, when it is determined that color represented by the image data changes to a predetermined degree as a result of the above-mentioned first and second steps being carried out, a color correcting process (a fifth step) may be carried out. By thus carrying out color correcting process, the image data read from the original image can have color more precisely identical to the original color.

Further, a sixth step of carrying out a shading correcting process on the image data and a seventh step of carrying out a color correcting process when color represented by the image data changes to a predetermined degree as a result of the above-mentioned first, second and sixth steps being carried out, may be provided. By thus carrying out the color correcting process, the image data read from the original image can have color more precisely identical to the original color.

Further, an eighth step of determining whether the obtained image data is of halftone dots may be provided, and, a configuration may be provided to select a mode in which, when it is determined in the eighth step that the image data is of halftone dots, the above-mentioned third step is carried out with the first and second step being omitted.

Further, a configuration may be provided to select a mode in which, when it is determined in the fourth step that the image data is of a monochrome image, the above-mentioned color correcting process is not carried out.

Further, a configuration may be provided to select a mode in which, when it is determined in the fourth step that the image data is of a monochrome image, a tone adjusting process is carried out in the above-mentioned color correcting process.

An image reading apparatus in an embodiment has a reading part in which adjacent image sensors are arranged in a staggering manner with the adjacent image sensors being overlapped by a predetermined number of pixels in a main scan direction, an obtaining part configured to obtain image data in overlapped parts of the respective adjacent image sensors, and a joint part correcting part configured to correct the image data obtained from the overlapped parts, are used.

In this image reading apparatus, a first part is provided by which, when a position shift occurs in the image sensor, correcting coefficients according to an amount of the position shift are used to multiply the image data thus obtained by the obtaining part. Thereby, values of expected pixels are calculated by the first part. Then, by a second part, weighting factors according to positions of respective pixels in the main scan direction of the adjacent image sensors are used to multiply the corrected image data obtained by the first part. Then, by a third part, the corrected image data thus obtained by the second part is added together between the adjacent image sensors. Thereby, image data in the overlapped parts is obtained. By a fourth part, it is determined whether the image data thus read by means of the reading part is of a color image or of a monochrome image.

In the above-mentioned image reading apparatus, when a position shift of an image sensor occurs, the expected pixels are calculated according to the amount of the position shift, the weighting factors according to the positions of the respective pixels of the adjacent image sensors in the main scan direction are used to multiply the thus-obtained corrected image data, and the thus-obtained image data is added together between the adjacent image sensors so that image data at the overlapped parts can be obtained. Thereby, accuracy in correcting image data improves. As a result, an influence of the position shift of the image sensor in the image data at the overlapped part is reduced. Further, because in the fourth step it is determined whether the image data read by means of the image sensors is of a color image or of a monochrome image, the image data can be then suitably processed.

Further, in this image reading apparatus, when it is determined that color represented by the image data changes to a predetermined degree as a result of the above-mentioned first and second parts carrying out the corresponding processes, a color correcting process (a fifth step) may be carried out.

By thus carrying out color correcting process, the image data read from the original image can have color more precisely identical to the original color.

Further, a shading correcting process may be carried out on the image data and a color correcting process may be carried out when color represented by the image data changes to a predetermined degree as a result of the above-mentioned first and second parts carrying out corresponding processes and the shading correcting process being carried out. By thus carrying out the color correcting process, the image data read from the original image can have color more precisely identical to the original color.

Further, a configuration may be provided by which the above-mentioned correcting coefficients may be selected according to the amount of the position shift.

Further, a configuration may be provided by which the correcting coefficients may be selected from a plurality of ones.

Further, a configuration may be provided by which the weighting factors may be selected from a plurality of ones.

Further, a halftone dot detecting part may be provided, configured to detect whether the image data at the overlapped part is of a halftone dot image. Then, a line for which the above-mentioned joint part correcting process is carried out and a line for which the above-mentioned joint part correcting process is not carried out may be combined when the halftone dot detecting parts determines that the image data is of a halftone dot image. It is noted that the above-mentioned "line" means a line of pixels arranged in the main scan direction. As a result of such lines being arranged in sequence in a sub-scan direction, the pixels are arranged two-dimensionally, and thus, a two-dimensional image, i.e., a page of image is created, for example.

Further, a halftone dot determining target area setting part may be provided, configured to determine whether the image data at the overlapped part is of a halftone dot image or a non-halftone dot image. Then, a line for which the above-mentioned joint part correcting process is carried out and a line for which the above-mentioned joint part correcting process is not carried out may be combined line by line when it is determined that the image data is of a halftone dot image in the thus-set halftone dot determining target area.

Further, a setting part may be provided, configured to arbitrarily set the number of lines for which the above-mentioned joint part correcting process is carried out and the number of lines for which the above-mentioned joint part correcting process is not carried out.

Further, it may be determined line by line whether the image data is of a halftone dot image, and, for a line determined as a halftone dot image, the above-mentioned joint part correcting process may not be carried out, and, for a line determined as a non-halftone dot image, the above-mentioned joint part correcting process may be carried out.

Further, a part may be provided, configured to reduce the number of pixels of those at the overlapped part, on which pixels the joint part correcting process is carried out.

Further, as an embodiment, an image forming apparatus provided with the above-mentioned image reading apparatus may be provided.

Further, as an embodiment, a computer readable information recording medium storing a program therein for causing a computer to act as a joint part correcting part for correcting for a part at which adjacent image sensors are overlapped each other in an image reading apparatus which includes a reading part in which the adjacent image sensors are arranged in a staggering manner with the adjacent image sensors being overlapped by a predetermined number of pixels in a main scan direction and an obtaining part configured to obtain image data in overlapped parts of the respective adjacent image sensors. The joint part correcting part includes a first part by which, when a position shift occurs in the image sensor, correcting coefficients according to an amount of the position shift are used to multiply the image data thus obtained by the obtaining part. Thereby, values of expected pixels are calculated by the first part. The joint part correcting part further includes a second part by which, then weighting factors according to positions of respective pixels in the main scan direction of the adjacent image sensors are used to multiply corrected image data obtained by the first part. The joint part correcting part further includes a third part by which, corrected image data thus obtained by the second part is added together between the adjacent image sensors. Thereby, image data in the overlapped parts is obtained. The joint part correcting part further includes a fourth part by which, it is determined whether the image data thus read by means of the reading part is of a color image or of a monochrome image.

By using the above-mentioned program, when a position shift of an image sensor occurs, expected pixels are calculated according to an amount of the position shift, weighting factors according to the positions of respective pixels of the adjacent image sensors in the main scan direction are used to multiply the thus-obtained corrected image data, and the thus-obtained image data is added together between the adjacent image sensors so that image data at the overlapped parts can be obtained. Thereby, accuracy in correcting image data improves. As a result, an influence of the position shift of the image sensor in the image data at the overlapped part is reduced. Further, because in the fourth step it is determined whether the image data read by means of the image sensors is of a color image or of a monochrome image, the image data can be then suitably processed.

In an embodiment which will now be described with reference to figures, the above-mentioned reading part corresponds to first, second and third image sensors (CIS) 151, 152 and 153. The above-mentioned obtaining part corresponds to first, second and third A/D converters 101, 102 and 103, and first and second memories 111 and 112. The above-mentioned color/monochrome determining part corresponds to a color/monochrome determining part 202.

The above-mentioned joint part connecting part corresponds to a joint part correcting circuit 200. The above-mentioned first part corresponds to cubic convolution parts 230, 231 and 232. The above-mentioned second part corresponds to weighting factor parts 210, 211 and 212, and multiplying parts 220, 221 and 222. The above-mentioned third part corresponds to an adding circuit 250.

The above-mentioned halftone dot detecting part and halftone dot determining target area setting part correspond to a halftone dot detecting circuit 201. The above-mentioned part configured to arbitrarily set a line for which a joint part correcting process is carried out and a line for which the joint part correcting process is not carried out corresponds to selectors 245, 246, 247 and 248. The above-mentioned part configured to reduce the number of pixels corresponds to selectors 245, 246, 247 and 248. The above-mentioned image reading apparatus corresponds to an image reading part 100. The above-mentioned image forming apparatus corresponds to a copier body 500.

<Embodiment 1>

An embodiment 1 will now be described.

FIG. 1 depicts a block diagram of an image reading apparatus in the embodiment 1.

The image reading apparatus 100 includes the first, second and third image sensors (i.e., CIS: Contact Image Sensors) 151, 152 and 153, first, second and third A/D (i.e., analog to digital) converters 101, 102 and 103, first and second memories 111 and 112, and a line combining part 120.

In the image reading apparatus 100, the first, second and third image sensors 151, 152 and 153 are disposed in such a manner that each image sensor overlaps with another image sensor in a main scan direction by a predetermined number of pixels, for reading a given original image. Further, the second image sensor 152 is disposed on the most upstream side in a sub-scan direction (i.e., in FIG. 1, the top). The first and third image sensors 151 and 153 are disposed on a downstream side (i.e., in FIG. 1, the bottom side) at predetermined intervals. Thus, the image sensors 151, 152 and 153 are disposed in a staggering manner as depicted in FIG. 1.

Image data output from the first image sensor 151 is converted into a digital signal by means of the first A/D converter 101, and then, is input to the line combining part 120. Image data output from the second and third image sensors 152 and 153 is converted into respective digital signals by means of the second and third A/D converters 102 and 103, is then temporarily stored in the first and second memories 111 and 112, respectively, for the purpose of giving respective predetermined delay times, and then, is input to the line combining part 120 in such a manner that timing of inputting the image data coming from the first, second and third image sensors 151, 152 and 153 respectively is adjusted appropriately.

It is noted that, the first image sensor 151 is located at the most downstream side in the sub-scan direction, and thus, it is not necessary to give a delay to image data obtained from the first image sensor 151. Therefore, the image data output from the first image sensor 151 is not stored in a memory but is directly transferred to the line combining part 120.

The third image sensor 153 is located on the upstream side by lines from the first image sensor 151 for the purpose of easy adjustment. Therefore, image data output from the third image sensor 153 is stored in the second memory 112.

The image data coming from the first, second and third image sensors 151, 152 and 153 and provided with delays by the first and second memories 111 and 112, and is then sent to the line combining part 120, as mentioned above. The image data undergoes in the line combining part 120 correction concerning the overlapped parts. After that, the thus-corrected image data at the overlapped parts and the other image data coming from the first, second and third image sensors 151, 152 and 153 undergo a line creating process. After that, a thus-obtained line of image data is sent to a subsequent processing part.

Figure 2:
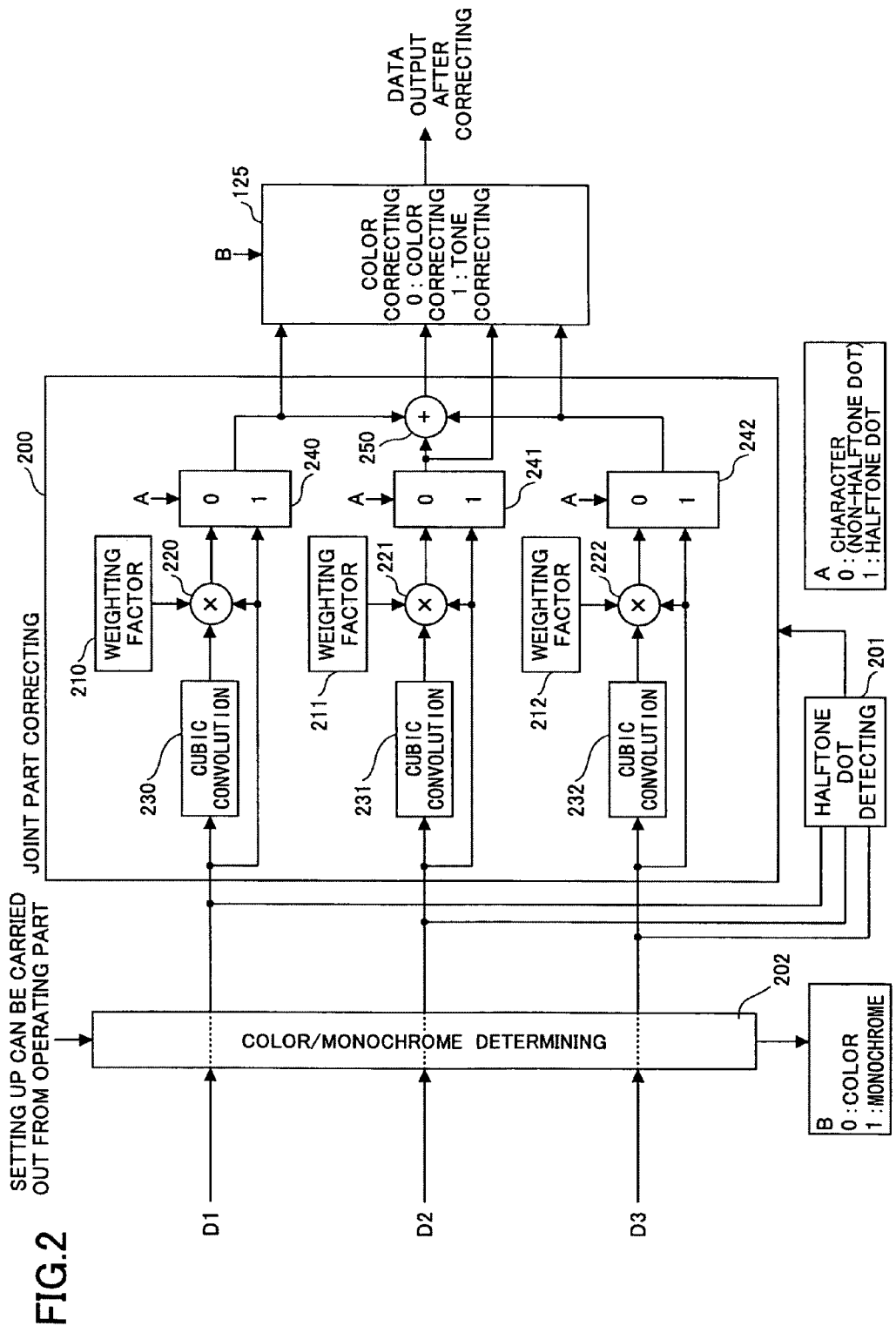
FIG. 2 depicts a block diagram of details of a line combining part used in the image reading apparatus shown in FIG. 1.

FIG. 2 depicts details of the above-mentioned line combining part 120 depicted in FIG. 1.

As depicted in FIG. 2, the line combining part 120 includes the joint part correcting circuit 200, the halftone dot detecting circuit 201 and the color/monochrome determining part 202.

First, image data input to the line combining part 120 is input to the color/monochrome determining part 202, which carries out determination as to whether the input image data is of a color image or a monochrome image. After that, the image data is input to the joint part correcting circuit 200. The joint part correcting circuit 200 includes the first, second and third cubic convolution parts 230, 231 and 232, the first, second and third weighting factor parts 210, 211 and 222, the first, second and third multiplying circuit 220, 221 and 222, first, second and third selectors 240, 241 and 242, and the adding circuit 250.

The first cubic convolution part 230, the first multiplying circuit 220 and the first selector 240 are connected in series. To the first selector 240, both image data output from the first multiplying part 220 and image data not passing through the first cubic convolution part 230 and the first multiplying circuit 220 are input. Therefore, the first selector 240 selects any one of the image data output from the first multiplying part 220 and image data not passing through the first cubic convolution part 230 and the first multiplying circuit 220.

To the first multiplying circuit 220, a weighting factor output from the weighting factor part 210 and image data not passing through the cubic convolution part 230 are input in addition to image data output from the cubic convolution part 230. Such a circuit configuration is also provided concerning each of the second and third cubic convolution parts 231 and 232 in parallel, as depicted in FIG. 2. To these circuit configurations, image data D1, D3 and D3 from the overlapped parts of the first, second and third image sensors 151, 152 and 153 are input, respectively. For example, image data D1 comes from the overlapped part of the image sensor 151, image data D2 comes from the overlapped part of the image sensor 152, and image data D3 comes from the overlapped part of the images sensor 153. As mentioned above, the overlapped part means respective parts of adjacent two image sensors at which these image sensors overlap with one another in the main scan direction.

The adding circuit 250 is provided subsequent to the first, second and third selectors 240, 241 and 242. Image data output from the selectors 240, 241 and 242 is input to the adding circuit 250, which carries out adding the input image data together, and thus, the thus-obtained image data is output as image data having undergone a joint part correcting process, after undergoing a color correcting process in the color correcting part 125.

The halftone dot detecting circuit 201 provided in addition to the joint part correcting circuit 200 has the image data D1, D2 and D3 coming from the overlapped parts of the image sensors 151, 152 and 153 input thereto. The halftone dot detecting circuit 201 determines whether input image data is of a halftone dot area or of a non-halftone dot area (i.e., an image area of characters/letters, for example). Based on the determination result, the selectors 240, 241 and 242 determine which one of image data input to these selectors 240, 241 and 242 is to be selected.

In the embodiment 1, when the halftone dot detecting circuit 201 determines that the image data is of a non-halftone dot (i.e., character/letter, for example) area, the halftone dot detecting circuit 201 outputs "0". When the halftone dot detecting circuit 201 determines that the image data is of a halftone dot area, the halftone dot detecting circuit 201 outputs "1". The image data of a non-halftone dot area is then processed by the above-mentioned cubic convolution parts, while the image data of a halftone dot area may not be processed by the cubic convolution parts. That is, the image data of a halftone dot area at the overlapped parts may be output from the joint part correcting circuit 200 without actually being processed by the cubic convolution parts 230-232 and the multiplying circuits 220-222.

However, for image data of a so-called solid color, the image data should not be processed by the cubic convolution parts, and thus, the image data may not be processed by the cubic convolution parts 230-232, and may be processed by the multiplying circuit 220-222 which carry out multiplying processes.

Technology to determine whether given image data is of a halftone dot area or of a non-halftone dot area is well-known, and various methods have been proposed. Therefore, description therefore will be omitted. For example, halftone dots may be detected in a method described later with reference to FIGS. 22-25 provided for an embodiment 2, and thus, it may be determined whether given image data is of a halftone dot area or of a non-halftone dot area.

In the line combining part 120 configured as described above, the color/monochrome determining part 202 determines whether the above-mentioned image data D1, D2 and D3 of the overlapped parts (also referred to as joint parts) of the image sensors 151, 152 and 153 is of a color image or of a monochrome image. Then, the image data is input to the joint part correcting circuit 200. Then, the image data is processed through paths determined according to a result A (i.e., whether the image data is of a halftone dot area or of a non-halftone dot area) output from the halftone dot detecting circuit 201. After that, the image data is output as image data having undergone a joint part correcting process carried out by the joint part correcting circuit 200.

However, determination as to whether given image data is of a color image or of a monochrome image may be carried out by setting operation carried out by a user on an operating part 115 shown in FIG. 1. A configuration may be provided whereby, when the above-mentioned setting operation is carried out on the operating part 115, a path of the image not being sent to the color/monochrome determining part 202 but being directly sent to the joint part correcting circuit 200 is selected.

Further, a determination result of the color/monochrome determining part 202 is sent to the color correcting part 125, and a specific process carried out by the color correcting part 125 is determined, as will be described later. Further, as mentioned above, when a result of the halftone dot detecting circuit 201 is of a non-halftone dot area (i.e., characters/letters or such) ("0"), a joint part correcting process may be carried out by the joint part correcting circuit 200, while, when a result of the halftone dot detecting circuit 201 is of a halftone dot range ("1"), a joint part correcting process of the joint part correcting circuit 200 may be omitted.

Details of functions of the cubic convolution parts 230-232 and the weighting factor parts 210-212 will be described later.

In the embodiment 1 configured as described above, when given image data is of characters or such (i.e., of a non-halftone dot area), values of expected pixels are calculated for the above-mentioned overlapped parts with the use of the cubic convolution parts 230-232, and thus, a correcting process for a possible position shift of the image sensor in the main scan direction is carried out. The correcting process will be described later. Next, for the image data D1, D2 and D3 having undergone this correcting process, arbitrary weighting factors are selected by the weighting factor parts 210-212, and the thus-selected weighting factors are used to multiply by means of the multiplying circuit 220-222. After that, the adding circuit 250 adds together the image data D1, D2 and D3 of the overlapped parts, having undergone the above-mentioned correcting process and multiplied with the weighting factors. Details of this adding process will be described later. On the other hand, when the image data D1, D2 and D3 is of a halftone area, the processes carried out by the cubic convolution parts 230-232 and the multiplying circuits 220-222 may be omitted, the image data D1, D2 and D3 may then be sent to the adding circuit 250 directly, and the adding circuit 250 may add the image data together between the adjacent image sensors. Details of this adding process will be described later.

Figure 3:
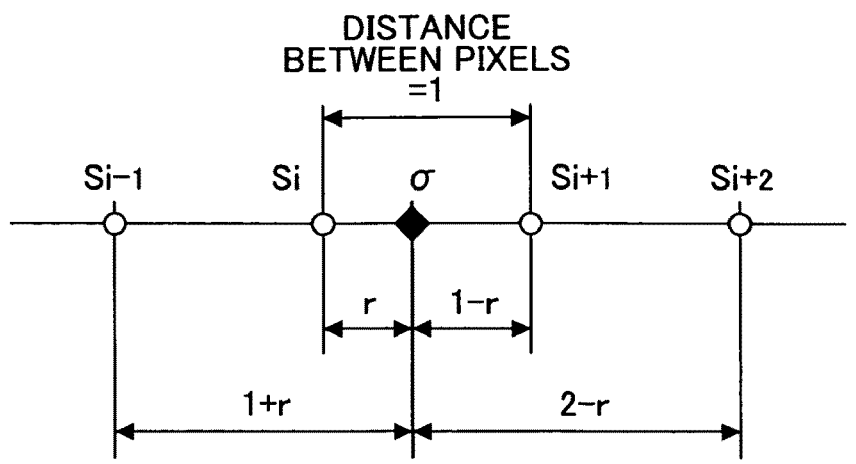
FIG. 3 illustrates tone calculation for an expected pixel in a cubic convolution method.
Figure 4:
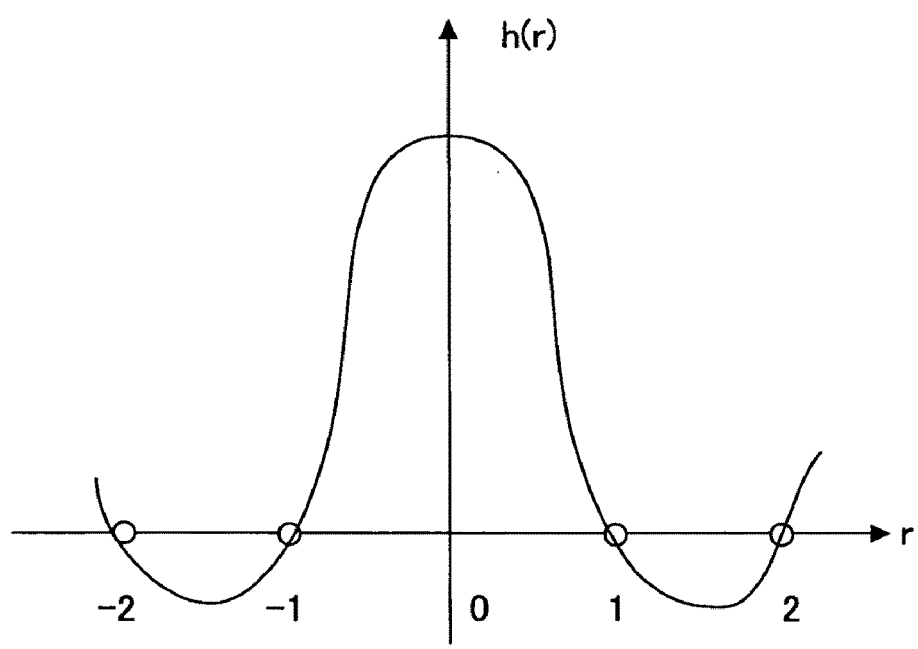
FIG. 4 depicts a relationship between an inter-pixel distance and a correcting coefficient.

FIG. 3 illustrates calculation of values of expected pixels (or calculation of tone levels for expected pixels) according to a cubic convolution method carried out by the cubic convolution parts 230-232. FIG. 4 depicts a relationship between an inter-pixel distance and correcting coefficients. FIG. 5 depicts a table for the correcting coefficients.

In FIG. 4, an abscissa axis represents the distance and an ordinate axis represents the correcting coefficient.

With reference to FIGS. 3-5, a method of calculating values of expected pixels carried out by the cubic convolution parts 230-232 will be described.

With reference to FIG. 3, with the use of image data of four adjacent pixels on one line, i.e., a target pixel ($S_i$), a pixel ($S_{i+1}$) after the target pixel ($S_i$) by one pixel, a pixel ($S_{i+2}$) after the target pixel ($S_i$) by two pixels, and a pixel ($S_{i-1}$) before the target pixel ($S_i$) by one pixel, a value ($\sigma$) of an expected pixel located between the target pixel Si and the pixel Si+1 is calculated. The thus-calculated values of the expected pixel is used as a value of the target pixel Si, i.e., the corrected image data of the target pixel $S_i$.

That is, FIG. 3 depicts a case where a position of an image sensor (CIS) shifts by a distance r in a direction (left direction in FIG. 3) opposite to the main scan direction. It is noted that, in FIG. 3, the pixels $S_{i-1}$, $S_i$, $S_{i+1}$ and $S_{i+2}$ mean respective sensor elements corresponding to respective pixels which the image sensor has. In the case of FIG. 3, the correct position of the target pixel Si is a position of $\sigma$. Therefore, as the correct value of the target pixel $S_i$, a pixel located at $\sigma$, i.e., the value of the expected pixel, should be obtained as corrected image data.

As a calculation formula for calculating the value of the expected pixel ($\sigma$), the following formula (1) is used:

$$\sigma = \{S_{i-1} \times h(1+r) + S_i \times h(r) + S_{i+1} \times h(1-r) + S_{i+2} \times h(2-r)\} / \{h(1+r) + h(r) + h(1-r) + h(2-r)\} \quad (1)$$

A variant h(r) in the above formula (1) represents a formula expressing a relationship between the inter-pixel distance r and the corresponding correcting coefficient h(r), and is expressed by the following formula (2):

$$h(r) = 1 - 2|r|^2 + |r|^3 \ (0 \leq |r| \leq 1),\ 4 - 8|r| + 5|r|^2 - |r|^3 \ (1 \leq |r| \leq 2),\ 0 \ (2 \leq |r|) \quad (2)$$

FIG. 4 depicts a variation of the correcting coefficient h(r) with respect to the inter-pixel distance r.

FIG. 5 depicts a table of the above-mentioned correcting coefficients h(r) contrived from the above-mentioned formula (2), and depicts one example in which an accuracy of the correction is 1/8 pixel. In FIG. 5, in "r(CODE)", "DECIMAL EXPRESSION", lines 0, 1, 2, ..., 7, correcting coefficients h(1+r), h(r), h(1−r), h(2−r) for respective cases where a position shift amount r of the image sensor (CIS) in the main scan direction is 0/8 pixel, 1/8 pixel, 2/8 pixel, ..., 7/7 pixel, are shown, respectively. 0/8 pixel, 1/8 pixel, 2/8 pixel, ..., 7/8 pixel means respective distances of 0/8, 1/8, 2/8, ..., 6/8 of an inter-pixel distance of adjacent pixels which is used as a reference.

Figure 6:
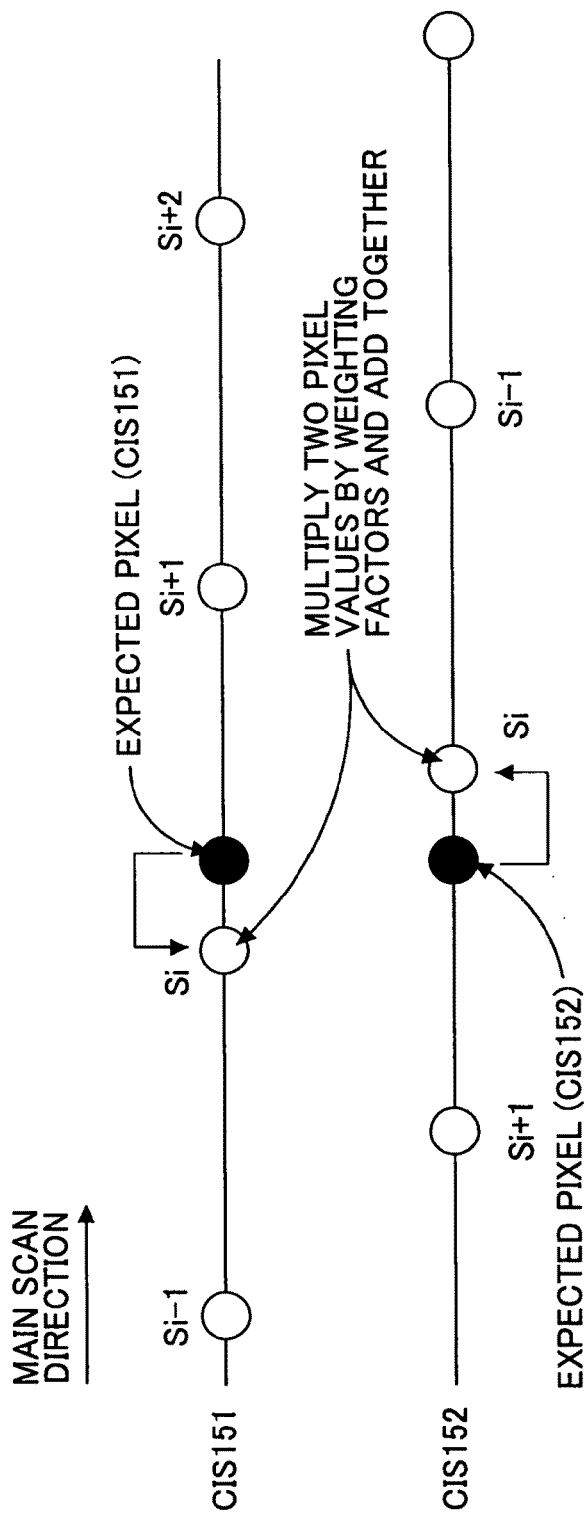
FIG. 6 illustrates how to derive joint part corrected data.

FIG. 6 illustrates a method of contriving image data in the joint part correcting process.

Values of the respective correcting coefficients h(1+r), h(r), h(1−r) and h(2−r) depicted in the table of FIG. 5 are used to substitute for the corresponding correcting factors in the formula (1), and thus, the value of the expected pixel is calculated. For example, when an actual shift amount r of the image sensor in the main scan direction is 7/8 pixel, the value of the expected pixel $\sigma$ is obtained from the value of the respective pixels $S_{i-1}$, $S_i$, $S_{i+1}$ and $S_{i+2}$ as a result of the values of the respective correcting coefficients h(1+r), h(r), h(1−r) and h(2−r) on the corresponding bottom line of the table of FIG. 5 being used to substitute, in a basic method. An actual method of obtaining the value of the expected pixel with the use of the cubic convolution method carried out by the cubic convolution parts in the embodiment 1 for the above-mentioned case where the shift amount r of the image sensor 151 or 152 in the main scan direction is 7/8 pixel, will now be described. It is noted that, this case corresponds to the case, in FIG. 16, concerning the embodiment 2, for the ±7/8 of MAIN SCAN DIRECTION SHIFT AMOUNT.

When the halftone dot detecting circuit 201 determines that image data is of characters or such (i.e., a non-halftone dot area), 128 pixels are set for each of the overlapped parts of the adjacent image sensors 151 and 152 therebetween, for example. Then, for image data from the left image sensor 151, among the 128 pixels, values of expected pixels (represented by a black solid circle in FIG. 6) are calculated with the use of the correcting coefficients of 0, 1, 2, ..., 7 of "r (CODE)", "DECIMAL EXPRESSION" of FIG. 5, for each 16 pixels as a unit, in sequence from the left of the above-mentioned 128 pixels. Further, weighting factors of 7/8, 6/8, 5/8, ..., 1/8 are multiplied by means of the multiplying circuit 220, for each 16 pixels as a unit, in sequence from the left of the above-mentioned 128 pixels.

Figure 7:
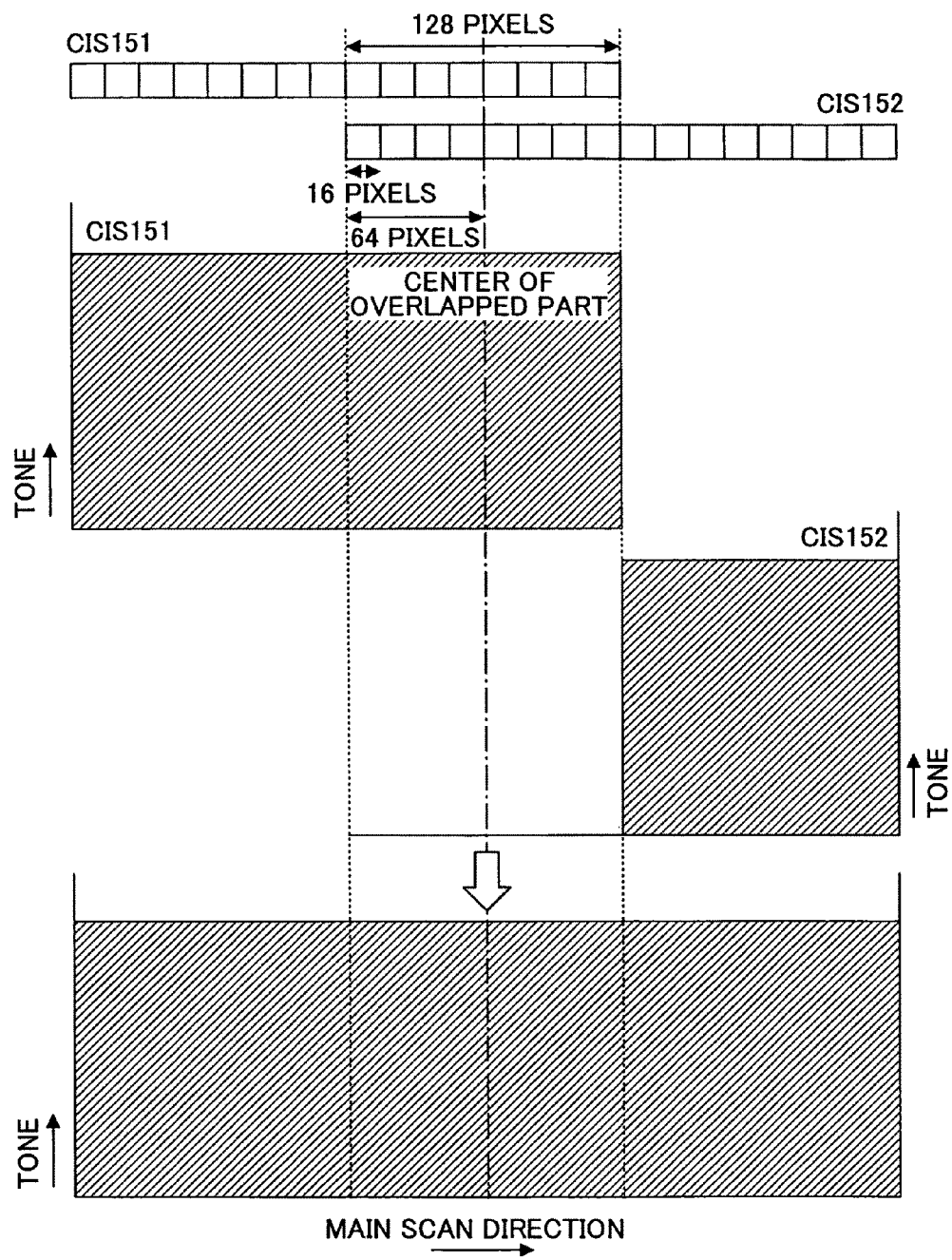
FIGS. 7, 8, 9, 10 and 11 illustrate a relationship between tones obtained from adjacent image sensors and positions in a main scan direction.

That is, in this case, the 128 pixels at the right end of the left image sensor 151 are overlapped in the main scan direction with the 128 pixels at the left end of the right image sensor 152, respectively (for example, see FIGS. 1 and 7). Therefore, the 128 pixels at the right end of the image sensor 151 correspond to pixels at the overlapped part. As mentioned above, the 128 pixels at the overlapped part are divided for each 16 pixels as a unit. Thereby, total 8 units of pixels are obtained from the 128 pixels. From among the 8 units, for a base portion of the overlapped part of the image sensor 151, that is, 16 pixels at the left end of the 128 pixels, the correcting coefficients of "0" of "DECIMAL EXPRESSION" of "r(CODE)" of FIG. 5 are used to calculate the values of the expected pixels, by means of the cubic convolution part 230.

Figure 8:
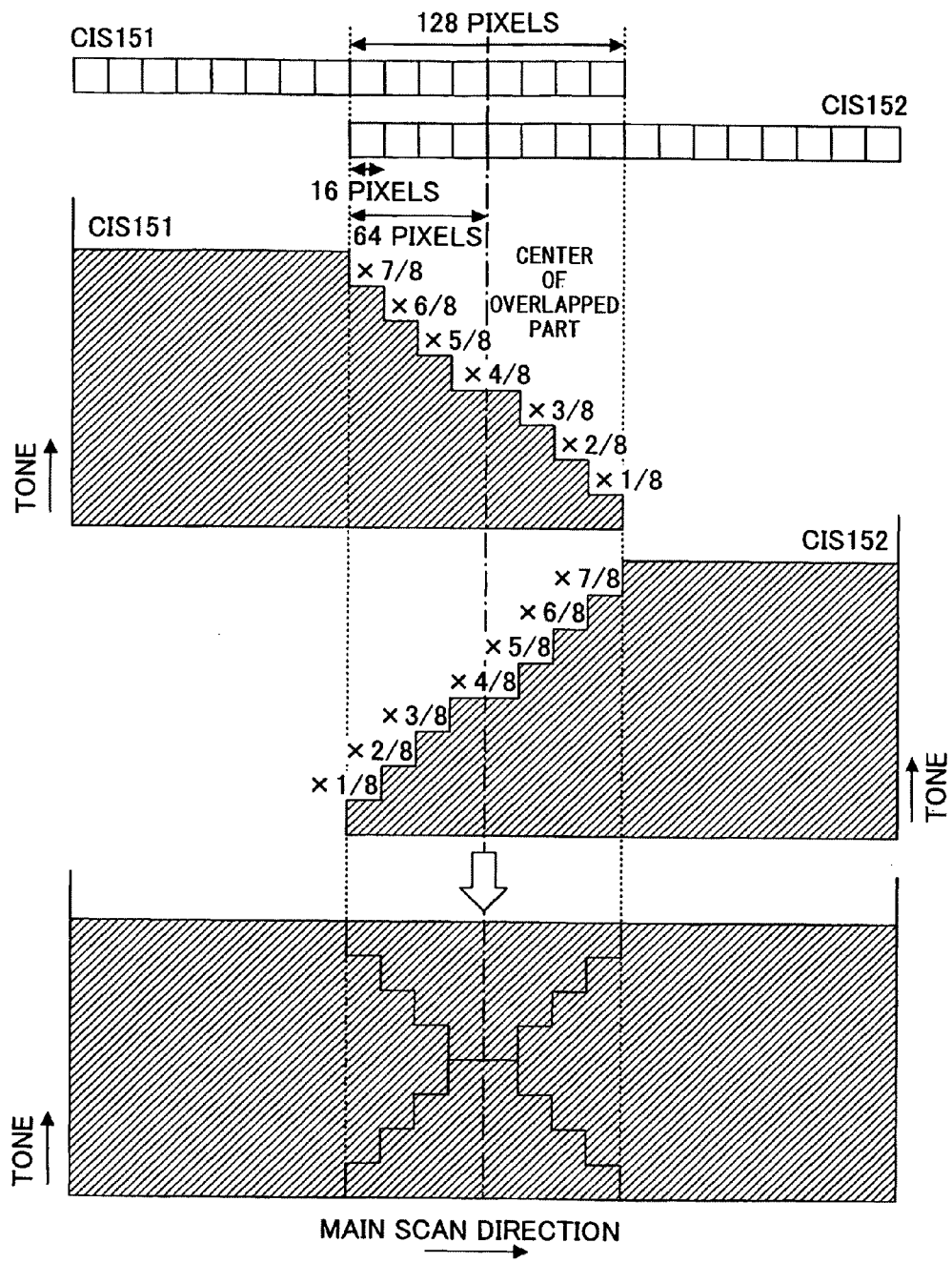

Further, for the same base portion, 16 pixels, the weighting factor of "7/8" is used to multiply by means of the weighting factor part 210 and the multiplying circuit 220. Next, from among the 8 units, for the second unit from the base portion of the overlapped part of the image sensor 151, that is, 16 pixels at the second unit from the left end of the 128 pixels, the correcting coefficients of "1" of "DECIMAL EXPRESSION" of "r(CODE)" of FIG. 5 are used to calculate the values of the expected pixels, by means of the cubic convolution part 230. Further, for the same second unit from the base portion, 16 pixels, the weighting factor of "6/8" is used to multiply by means of the weighting factor part 210 and the multiplying circuit 220. Similarly, from among the 8 units, for the third through eighth units from the base portion of the overlapped part of the image sensor 151, that is, each 16 pixels at the third through eighth units from the left end of the 128 pixels, the respective correcting coefficients of "2" through "7" of "DECIMAL EXPRESSION" of "r(CODE)" of FIG. 5 are used to calculate the values of the expected pixels, respectively, by means of the cubic convolution part 230. Further, for the same third through eighth units from the base portion, each 16 pixels, the respective weighting factors of "5/8" through "1/8" are used to multiply, respectively, by means of the weighting factor part 210 and the multiplying circuit 220. It is noted that, as to the assignment of the weighting factors, as shown in FIG. 8, the same weighting factor of "4/8" is used twice for both fourth and fifth units from the left end.

Thus, in the embodiment 1, a correcting method for correcting for a position shift (a distance of less than an amount of one pixel, i.e., a distance of less than an inter-pixel distance of adjacent pixels as mentioned above) of the image sensor, i.e., a position shift of a reading part, in the main scan direction, is determined in such a manner that, a position shift to be corrected for, increases steps by step, as a position moves from the base portion through the end portion of the overlapped part. That is, i.e., in the above-mentioned example, the correcting coefficients of "0" (basically for a position shift of 0/8 pixel) are used for the base portion to calculate the values of the expected pixels, the correcting coefficients of "1" (basically for a position shift of 1/8 pixel) are used for the second unit from the base portion, and the correcting coefficients of "7" (basically for a position shift of 7/8 pixel) are used for the eighth unit from the base portion, i.e., the end portion of the pixels at the overlapped part, as mentioned above. On the other hand, as to the weighting factors, the weighting factor decreases steps by step, as a position moves from the base portion through the end portion of the overlapped part.

For image data from the right image sensor 152, among the 128 pixels, values of expected pixels are calculated with the use of the correcting coefficients of 0, 1, 2, . . . , 7 of "r (CODE)", "DECIMAL EXPRESSION" of FIG. 5, for each 16 pixels as a unit, in sequence from the right of the above-mentioned 128 pixels. Further, weighting factors of 7/8, 6/8, 5/8, . . . , 1/8 are multiplied by means of the multiplying circuit 221, for each 16 pixels as a unit, in sequence from the right of the above-mentioned 128 pixels.

That is, in this case, the 128 pixels at the left end of the right image sensor 152 are overlapped in the main scan direction with the 128 pixels at the right end of the left image sensor 151, respectively (for example, see FIGS. 1 and 7). Therefore, the 128 pixels at the left end of the image sensor 152 correspond to pixels at the overlapped part. As mentioned above, the 128 pixels at the overlapped part are divided for each 16 pixels as a unit. Thereby, total 8 units of pixels are obtained.

From among the 8 units, for a base portion of the overlapped part of the image sensor 152, that is, 16 pixels at the right end of the 128 pixels, the correcting coefficients of "0" of "DECIMAL EXPRESSION" of "r(CODE)" of FIG. 5 are used to calculate the values of the expected pixels, by means of the cubic convolution part 231. Further, for the same base portion, 16 pixels, the weighting factor of "7/8" is used to multiply by means of the weighting factor part 211 and the multiplying circuit 221. Next, from among the 8 units, for the second unit from the base portion of the overlapped part of the image sensor 152, that is, 16 pixels at the second unit from the right end of the 128 pixels, the correcting coefficients of "1" of "DECIMAL EXPRESSION" of "r(CODE)" of FIG. 5 are used to calculate the values of the expected pixels, by means of the cubic convolution part 231. Further, for the same second unit from the base portion, 16 pixels, the weighting factor of "6/8" is used to multiply by means of the weighting factor part 211 and the multiplying circuit 221. Similarly, from among the 8 units, for the third through eighth units from the base portion of the overlapped part of the image sensor 152, that is, each 16 pixels at the third through eighth units from the right end of the 128 pixels, the respective correcting coefficients of "2" through "7" of "DECIMAL EXPRESSION" of "r(CODE)" of FIG. 5 are used to calculate the values of the expected pixels, respectively, by means of the cubic convolution part 231. Further, for the same third through eighth units from the base portion, each 16 pixels, the respective weighting factors of "5/8" through "1/8" are used to multiply, respectively, by means of the weighting factor part 211 and the multiplying circuit 221.

Thus, the same as above, a correcting method for correcting for a position shift (a distance of less than an amount of one pixel, i.e., a distance of less than an inter-pixel distance of adjacent pixels as mentioned above) of the image sensor, i.e., a position shift of a reading part, in the main scan direction, is determined in such a manner that, a position shift to be corrected for, increases steps by step, as a position moves from the base portion through the end portion of the overlapped part. On the other hand, as to the weighting factors, the weighting factor decreases steps by step, as a position moves from the base portion through the end portion of the overlapped part.

As to the above-mentioned correcting coefficients, in the embodiment 1, the correcting coefficients for the respective position shift amounts of 0/8 pixel, . . . , 7/8 pixel are used for each 16 pixels as a unit. However, an actual method is not limited to this way. For another example, the same correcting coefficients may be used to calculate values of expected pixels for the above-mentioned 128 pixels of the overlapped part to correct image data. Thus, various ways may be arbitrarily selected.

Further. It is noted that, in the above description, among the three image sensors 151, 152 and 153, how to process image data at the overlapped parts between the adjacent two image sensors 151 and 152 has been described. However, for the other combination, i.e., as to how to process image data at the overlapped parts between the adjacent two image sensors 152 and 153, the same process is carried out, and duplicate description will be omitted.

After that, the adding circuit 250 carries out an adding process. That is, for image data at the overlapped parts of the adjacent two image sensors 151 and 152, as mentioned above, the cubic convolution part 230 calculates values of expected pixels and the multiplying circuit 220 multiplies the weighting factors to the image data at the overlapped part of the image sensor 151, and similarly, the cubic convolution part 231 calculates values of expected pixels and the multiplying circuit 221 multiplies the weighting factors to the image data at the overlapped part of the image sensor 152. Then, the thus-processed image data is added together for each corresponding pixel by the adding circuit 250 (see FIG. 6). As a result, image data at the overlapped parts of the adjacent two image sensors 151 and 152 is obtained.

Similarly, for image data at the overlapped parts of the adjacent two image sensors 152 and 153, as mentioned above, the cubic convolution part 231 calculates values of expected pixels and the multiplying circuit 221 multiplies the weighting factors to the image data at the overlapped part of the image sensor 152, and similarly, the cubic convolution part 232 calculates values of expected pixels and the multiplying circuit 222 multiplies the weighting factors to the image data at the overlapped part of the image sensor 153. Then, the thus-processed image data is added together for each corresponding pixel by the adding circuit 250. As a result, image data at the overlapped parts of the adjacent two image sensors 152 and 153 is obtained.

Further, the image data at the overlapped parts of the image sensors 151 and 152, and the image data at the overlapped parts of the image sensors 152 and 153, thus processed by the joint part correcting circuit 200, is then processed by the color correcting part 125 shown in FIG. 2. After that, the image data of the overlapped parts is combined with image data which has been output from the image sensors 151, 152 and 153, other than the image data at the overlapped parts, by the line creating circuit 123 shown in FIG. 1, which thus creates a complete line of image data. The specific contents of a process carried out by the color correcting part 125 will be described later. More specifically, in FIG. 1, the image data at the overlapped parts D1, D2 and D3 of the image data output from the image sensors 151, 152 and 153 is processed by the joint part correcting circuit 200 after being processed by the color/monochrome determining part 202. After that, the image data output from the joint part correcting circuit 200 is then processed by the color correcting part 125, and then, is sent to the line creating part 123. On the other hand, the image data of the image data output from the image sensors 151, 152 and 153, other than the above-mentioned image data D1, D2 and D3 of the overlapped parts, is directly transferred to the line creating part 123. Then, the line creating part 123 combines the image data D1, D2 and D3 of the overlapped parts thus processed and the other image data thus directly transferred thereto, to obtain a complete line of image data.

It is noted that, as mentioned above, image data determined as image data of a color image in the color/monochrome determining part 202 is processed by the joint part correcting circuit 200 as described above. On the other hand, image data determined as image data of a monochrome image in the color/monochrome determining part 202 may not be processed by the joint part correcting circuit 200, but may be directly transferred to the line creating part 123. In this case, the line creating part 123 may use, for image data of the overlapped parts, image data at any one of the overlapped parts of the adjacent two image sensors 151 and 152, and may use, for image data of the overlapped parts, image data at any one of the overlapped parts of the adjacent two image sensors 152 and 153, to obtain a complete line of image data, together with image data other than the image data of the overlapped parts.

Thus, in the embodiment 1, it is possible to connect image data at the overlapped parts in such a manner that influence of a possible position shift of the image sensor which causes a step difference of pixel tone values is reduced step by step. As a result, it is possible to reduce a step difference in pixel tone values caused by the position shift of the image sensor. It is noted that the term "pixel tone value" has the same meaning as a term "pixel value" or a term "a value of a pixel", hereinafter.

In a case where image data which is determined as image data of a halftone dot area by the halftone dot detecting circuit 201 is processed in the same manner as that for the case where image data is determined as image data of a non-halftone dot range (i.e., of a character/letter image area or such), a halftone dot part may disappear when a position shift of the image sensor occurs. In order to avoid such a problematic situation, as will be described with reference to FIGS. 7-10, how to combine image data obtained from both overlapped parts of the adjacent two image sensors 151 and 152, for example, is cyclically changed, line by line. For a first line of image data, as depicted in FIG. 7, image data obtained from the overlapped part of the image sensor 151 is used as it is, and image data obtained from the overlapped part of the image sensor 152 is not used.

FIG. 7 illustrates a relationship between pixel tone values obtained from the overlapped parts of the image sensors 151 and 152, and corresponding positions in the main scan direction.

In FIG. 7, the top part depicts pixels of the image sensor 151 disposed in the main scan direction. It is noted that each square represents 16 pixels. The part below the top part depicts pixels of the image sensor 152 disposed in the main scan direction. As can be seen, the image sensors 151 and 152 overlap with one another by a total of 128 pixels (16 pixels×8 squares) in the main scan direction as the overlapped parts. The part of further below in FIG. 7 depicts a relationship between pixel tone values output from the image sensor 151 and corresponding positions in the main scan direction. The part of further below in FIG. 7 depicts a relationship between pixel tone values output from the image sensor 152 and corresponding positions in the main scan direction. The bottom part of FIG. 7 depicts the outputs of both image sensors 151 and 152 being added together along the main scan direction.

In the case of FIG. 7, as depicted in the bottom part, in the state in which the outputs of both image sensors 151 and 152 are added together, a part in the main scan direction of the output of the image sensor 151 is larger than a part in the main scan direction of the output of the image sensor 152. This is because, as mentioned above, the output of the image sensor 151 is used for a part of the overlapped part.

For a second line of image data, the same process as that carried out on a non-halftone dot area (i.e., character/letter area) is carried out. That is, the cubic convolution parts 230 and 231 calculate values of expected pixels with the use of the above-mentioned correcting coefficients, and then, the multiplying circuits 220 and 221 multiply the weighting factors. Then, the adding circuit 250 adds the image data of the image sensors 151 and 152 together, to connect the image data at the overlapped parts.

FIG. 8 illustrates a relationship between pixel tone values obtained from the overlapped parts of the image sensors 151 and 152, and corresponding positions in the main scan direction, for the above-described process to be carried out for the second line of image data.

The same as in FIG. 7, in FIG. 8, the top part depicts pixels of the image sensor 151 disposed in the main scan direction. The part below the top part depicts pixels of the image sensor 152 disposed in the main scan direction. The part (third part) further below in FIG. 8 depicts a relationship between pixel tone values output from the image sensor 151 and corresponding positions in the main scan direction. The part (fourth part) further below in FIG. 8 depicts a relationship between pixel tone values output from the image sensor 152 and corresponding positions in the main scan direction. The bottom part of FIG. 8 depicts the outputs of both image sensors 151 and 152 being added together along the main scan direction.

As can be seen from the third and fourth parts of FIG. 8, in the overlapped parts, the multiplying circuits 220 and 221 multiply the weighting factors to the corresponding image data output from the image sensors 151 and 152, such that, the same as the case of image data of a non-halftone dot area described above, the weighting factors are different step by step in the main scan direction. More specifically, the weighting factors decease step by step as a position moves from the base portion through the end portion of the overlapped part of each image sensor.

Figure 9:
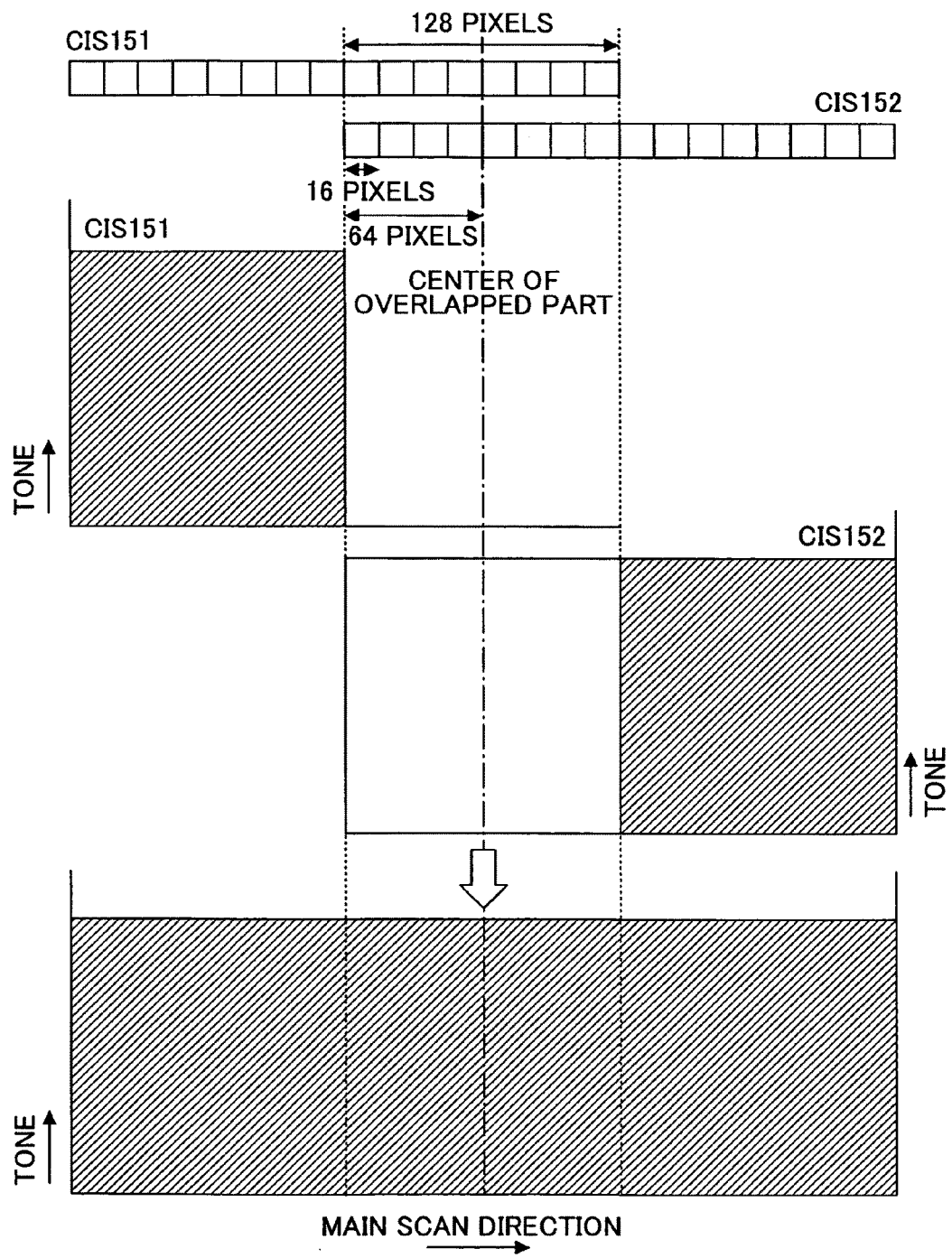

For a third line of image data, contrary to the first line of image data described above with reference to FIG. 7, as depicted in FIG. 9, image data obtained from the overlapped part of the image sensor 152 is used as it is, and image data obtained from the overlapped part of the image sensor 151 is not used.

FIG. 9 illustrates a relationship between pixel tone values obtained from the overlapped parts of the image sensors 151 and 152, and corresponding positions in the main scan direction.

In FIG. 9, the top part depicts pixels of the image sensor 151 disposed in the main scan direction. It is noted that each square represents 16 pixels. The part below the top part depicts pixels of the image sensor 152 disposed in the main scan direction. The part of further below in FIG. 9 depicts a relationship between pixel tone values output from the image sensor 151 and corresponding positions in the main scan direction. The part of further below in FIG. 9 depicts a relationship between pixel tone values output from the image sensor 152 and corresponding positions in the main scan direction. The bottom part of FIG. 9 depicts the outputs of both image sensors 151 and 152 being added together along the main scan direction.

In the case of FIG. 9, as depicted in the bottom part, in the state in which the outputs of both image sensors 151 and 152 are added together, a part in the main scan direction of the output of the image sensor 152 is larger than a part in the main scan direction of the output of the image sensor 151. This is because, as mentioned above, the output of the image sensor 152 is used for a part of the overlapped part.

For a fourth line of image data, the same as for the second line described above with reference to FIG. 8, the same process as that carried out on a non-halftone dot area (i.e., character/letter area) is carried out.

Figure 10:
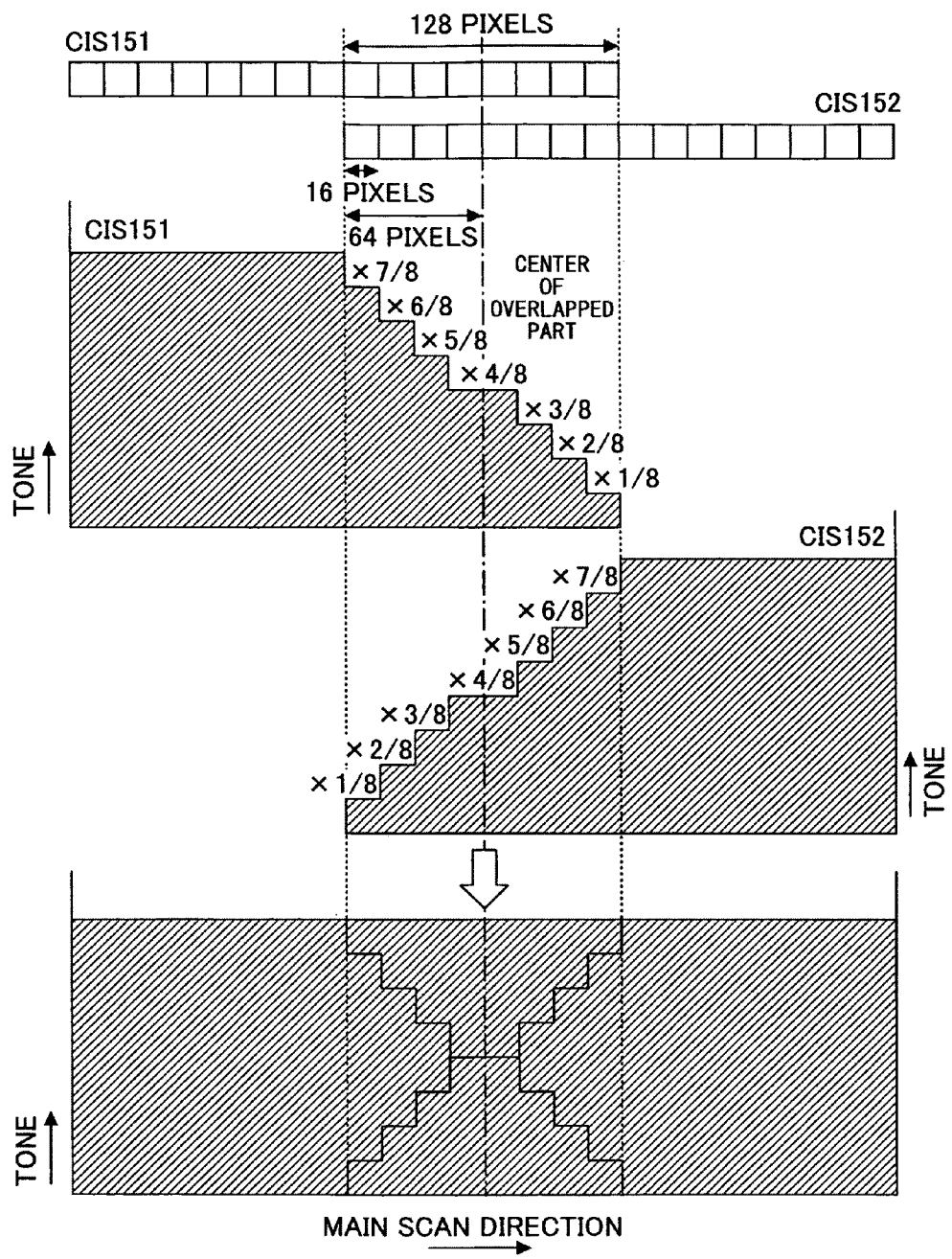

FIG. 10 illustrates a relationship between pixel tone values obtained from the overlapped parts of the image sensors 151 and 152, and corresponding positions in the main scan direction, for the above-described processed to be carried out for the fourth line of image data.

The same as in FIG. 7, in FIG. 10, the top part depicts pixels of the image sensor 151 disposed in the main scan direction. The part below the top part depicts pixels of the image sensor 152 disposed in the main scan direction. The part (third part) further below in FIG. 8 depicts a relationship between pixel tone values output from the image sensor 151 and corresponding positions in the main scan direction. The part (fourth part) further below in FIG. 8 depicts a relationship between pixel tone values output from the image sensor 152 and corresponding positions in the main scan direction. The bottom part of FIG. 8 depicts the outputs of both image sensors 151 and 152 being added together along the main scan direction.

As can be seen from the third and fourth parts of FIG. 10, in the overlapped parts, the multiplying circuits 220 and 221 multiply the weighting factors to the corresponding image data output from the image sensors 151 and 152, such that, the same as the case of image data of a non-halftone dot area described above, the weighting factors are different step by step in the main scan direction. More specifically, the weighting factors decease step by step as a position moves from the base portion through the end portion of the overlapped part of each image sensor.

Then, for the fifth line, the above-mentioned process described above with reference to FIG. 7 is returned to, and after that, the above-mentioned processes are repeated in the stated order of the respective processes of FIGS. 7, 8, 9 and 10.

Thus, in a control method according to the embodiment 1, it is possible to avoid such a problematic situation that a halftone dot part disappears for a halftone dot area.

Figure 11:
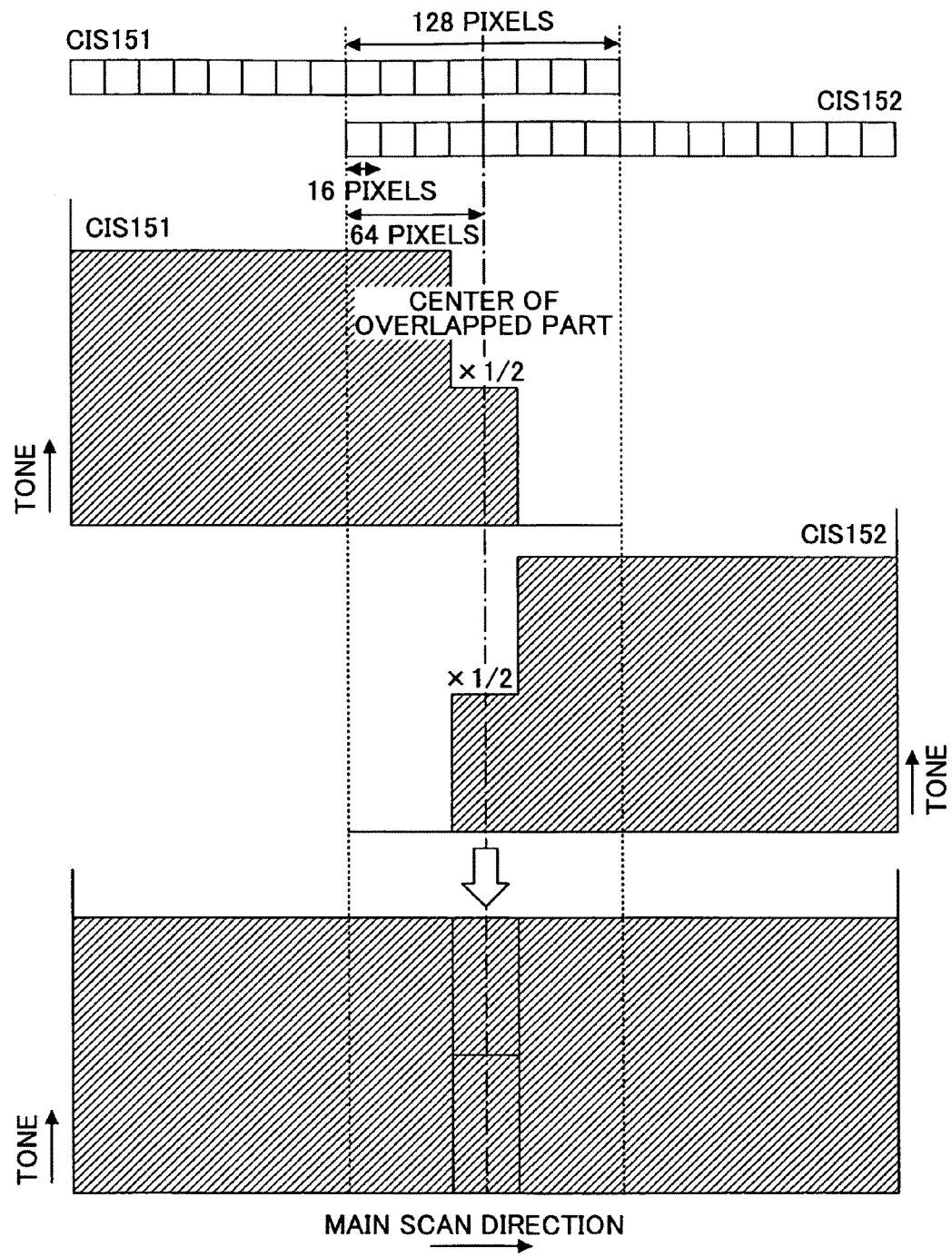

As another method than the control method described above with reference to FIGS. 7, 8, 9 and 10, a process of FIG. 11 may be carried out instead when a determination result of the halftone dot detecting circuit 201 is of a halftone dot area.

FIG. 11 illustrates a relationship between pixel tone values output from the image sensors 151 and 152 and corresponding positions in the main scan direction.

That is, as depicted in FIG. 11, the same as a case of a non-halftone dot area (i.e., character/letter area or such), the cubic convolution parts 230 and 231 calculate values of expected pixels with the use of the above-mentioned correcting coefficients, then the multiplying parts 220 and 221 multiply the weighting factors, and the adding circuit 250 connects the image data between the image sensors 151 and 152. In the case of FIG. 11, the number of pixels on which the cubic convolution parts 230 and 231 calculate values of expected pixels with the use of the above-mentioned correcting coefficients and then the multiplying parts 220 and 221 multiply the weighting factors, is reduced. More specifically, for a range of total 32 pixels including 16 pixels on the image sensor 151 and other 16 pixels on the image sensor 152 with respect to a center of the above-mentioned overlapped parts, the cubic convolution parts 230 and 231 calculate values of expected pixels with the use of the above-mentioned correcting coefficients, and then the multiplying parts 220 and 221 multiply the weighting factors. At this time, each of the weighting factors, used to multiply, by the multiplying circuit 220 and 221, on the image data corrected by values of expected pixels calculated by the cubic convolution parts 230 and 231 with the use of the above-mentioned correcting coefficients, is determined as ½. Then, the image data originally output from the image sensors 151 and 152 thus multiplied with the weighting factors are added by the adding circuit 250, so that the outputs of the image sensors 151 and 152 are connected.

By the control method described above with reference to FIG. 11, it is possible to avoid such a problematic situation that a halftone dot part disappears because of a joint part correcting process carried out by the joint part correcting circuit 200. There, the number of pixels on which the joint part correcting process is carried out, is determined as a total of 32 pixels as mentioned above. However, this number of pixels may be arbitrarily changed.

In the embodiment 1, a configuration is provided such that, it can be arbitrarily determined whether, for a process to be carried out on a halftone dot area, the above-mentioned first method described above with reference to FIGS. 7, 8, 9 and 10, or the second method described above with reference to FIG. 1, is actually used.

Next, a color correcting process carried out by the color correcting circuit 125 depicted in FIG. 2 will be described. It is noted that, the color correcting process described now is identical to the color correcting process of the embodiment 2 described later with reference to FIG. 26 (flow chart).

First, a process for when the color/monochrome determining part 202 determines that given image data is of a color image will be described.

Because the same process is carried out either for the overlapped parts between the image sensors 151 and 152 or for the overlapped parts between the image sensors 152 and 153, description will be made only for the overlapped parts between the image sensors 151 and 152, and description for the overlapped parts between the image sensors 152 and 153 will be omitted.

Image data of R, G and B (Red, Green and Blue) output from the overlapped parts between the image sensors 151 and 152 is stored for each pixel, after being transformed into well-known L*a*b image data. A configuration is provided such that the specific number of pixels to be stored may be set arbitrarily.

Next, in the same way, image data of R, G and B (Red, Green and Blue) output from the overlapped parts between the image sensors 151 and 152 and then having undergone the joint part correcting process (especially the processes carried out by the cubic convolution parts and the multiplying circuits) in the joint part correcting circuit 200 is stored for each pixel, after being transformed into L*a*b image data. Then, for each pixel, differences $\Delta L$, $\Delta a$ and $\Delta b$, between the L*a*b image data before and after the joint part correcting process (especially the processes carried out by the cubic convolution parts and the multiplying circuits) in the joint part correcting circuit 200 is obtained, and then, with the use of the following formula, a relative color difference $\Delta E^*$ is calculated. This calculation is carried out particularly for the image data obtained from the image sensor 151 (for $\Delta E1$) and the image data obtained from the image sensor 152 (for $\Delta E2$). However, such a configuration may be allowed that the image data obtained from only one image sensor 151 or 152 is used.

$$\Delta E^* = [(\Delta L)^2 + (\Delta a)^2 + (\Delta b)^2]^{1/2}$$

Then, when at least any one of thus obtained $\Delta E1$, which is $\Delta E^*$ obtained from the image data output from the image sensor 151 and $\Delta E2$, which is $\Delta E^*$ obtained from the image data output from the image sensor 152 is equal to or more than 1.5 (a configuration is provided such that this value may be set arbitrarily) for any pixel, it is determined that color in the image data at the overlapped parts has changed through the joint part correcting process. When it is thus determined that color in the image data at the overlapped parts has changed through the joint part correcting process, the image data of the image sensor 151 or 152, for which an average of $\Delta E1$ or $\Delta E2$ is smaller, and before being processed by the joint part correcting circuit 200, is used as the image data at the overlapped parts between the image sensors 151 and 152. It is noted that, the above-mentioned average of $\Delta E1$ or $\Delta E2$ may be an average of E1 or $\Delta E2$ with respect to all the pixels of the overlapped part, or an average of $\Delta E1$ or $\Delta E2$ with respect to a predetermined range of the pixels of the overlapped part. The image data at the overlapped parts between the image sensors 151 and 152 thus obtained is provided to the line creating circuit 123 which then creates a line of image data with the use of the thus-provided image data together with the other image data on the same line in combination.

On the other hand, when each one of the above-mentioned $\Delta E1$ and $\Delta E2$ is less than 1.5, it is determined that color in the image data at the overlapped parts has not changed through the joint part correcting process. In this case, the image data having undergone the joint part correcting circuit 200 is used as the image data at the overlapped parts. The image data at the overlapped parts thus obtained is provided to the line creating circuit 123 which then creates a line of image data with the use of the thus-provided image data together with the other image data on the same line in combination.

Next, a process for when the color/monochrome determining part 202 determines that given image data is of a monochrome image will be described.

In this case, as a first method, as mentioned above, the process to be carried out by the joint part correcting circuit 200 and the color correcting part 125 is omitted, any one of the outputs of the overlapped parts between the image sensors 151 and 152 is selected, and then combined with the other image data on the same line, for a complete line of image data by the line creating circuit 123. Alternatively, as a second method, the same process as that carried out for a case of a color image, described above, is carried out.

In the second method, image data of R, G and B (Red, Green and Blue) output from the overlapped parts between the image sensors 151 and 152 is stored for each pixel. Next, in the same way, image data of R, G and B (Red, Green and Blue) output from the overlapped parts between the image sensors 151 and 152 and then having undergone the joint part correcting process (especially the processes carried out by the cubic convolution parts and the multiplying circuits) in the joint part correcting circuit 200 is stored for each pixel. Then, for each pixel, differences dif_r1, dif_g1 and dif_b1 for R, G and B in the thus-stored image data is calculated before and after the joint part correcting process (especially the processes carried out by the cubic convolution parts and the multiplying circuits) for the image sensor 151. In the same way, for each pixel, differences dif_r2, dif_g2 and dif_b2 for R, G and B in the thus-stored image data is calculated before and after the joint part correcting process (especially the processes carried out by the cubic convolution parts and the multiplying circuits) for the image sensor 152. Then, when at least any one of thus obtained differences dif_r1, dif_g1, dif_b1, dif_r2, dif_g2 and dif_b2 is equal to or more than 1 [digit] (for a case where image data is of 8-bit data, total 256 tone levels can be expressed, 1 digit corresponds to 1 tone level, and this threshold is arbitrary set) for any pixel, it is determined that tone in the image data at the overlapped parts has changed through the joint part correcting process. When it is thus determined that tone in the image data at the overlapped parts has changed through the joint part correcting process, the image data of the image sensor 151 or 152, for which an average of the differences dif_r1, dif_g1 and dif_b1, or dif_r2, dif_g2 and dif_b2 is smaller, and before being processed by the joint part correcting circuit 200, is used as the image data at the overlapped parts between the image sensors 151 and 152. It is noted that, the above-mentioned average of dif_r1, dif_g1 and dif_b1, or dif_r2, dif_g2 and dif_b2 may be an average of dif_r1, dif_g1 and dif_b1, or dif_r2, dif_g2 and dif_b2 with respect to all the pixels of the overlapped part, or an average of dif_r1, dif_g1 and dif_b1, or dif_r2, dif_g2 and dif_b2 with respect to a predetermined range of the pixels of the overlapped part. The image data at the overlapped parts between the image sensors 151 and 152 thus obtained is provided to the line creating circuit 123 which then creates a line of image data with the use of the thus-provided image data together with the other image data on the same line in combination.

On the other hand, when each one of the above-mentioned differences dif_r1, dif_g1, dif_b1, dif_r2, dif_g2 and dif_b2 is less than 1 [digit], it is determined that tone in the image data at the overlapped parts has not changed through the joint part correcting process. In this case, the image data having undergone the joint part correcting circuit 200 is used as the image data at the overlapped parts. The image data at the overlapped parts thus obtained is provided to the line creating circuit 123 which then creates a line of image data with the use of the thus-provided image data together with the other image data on the same line in combination.

Figure 12:
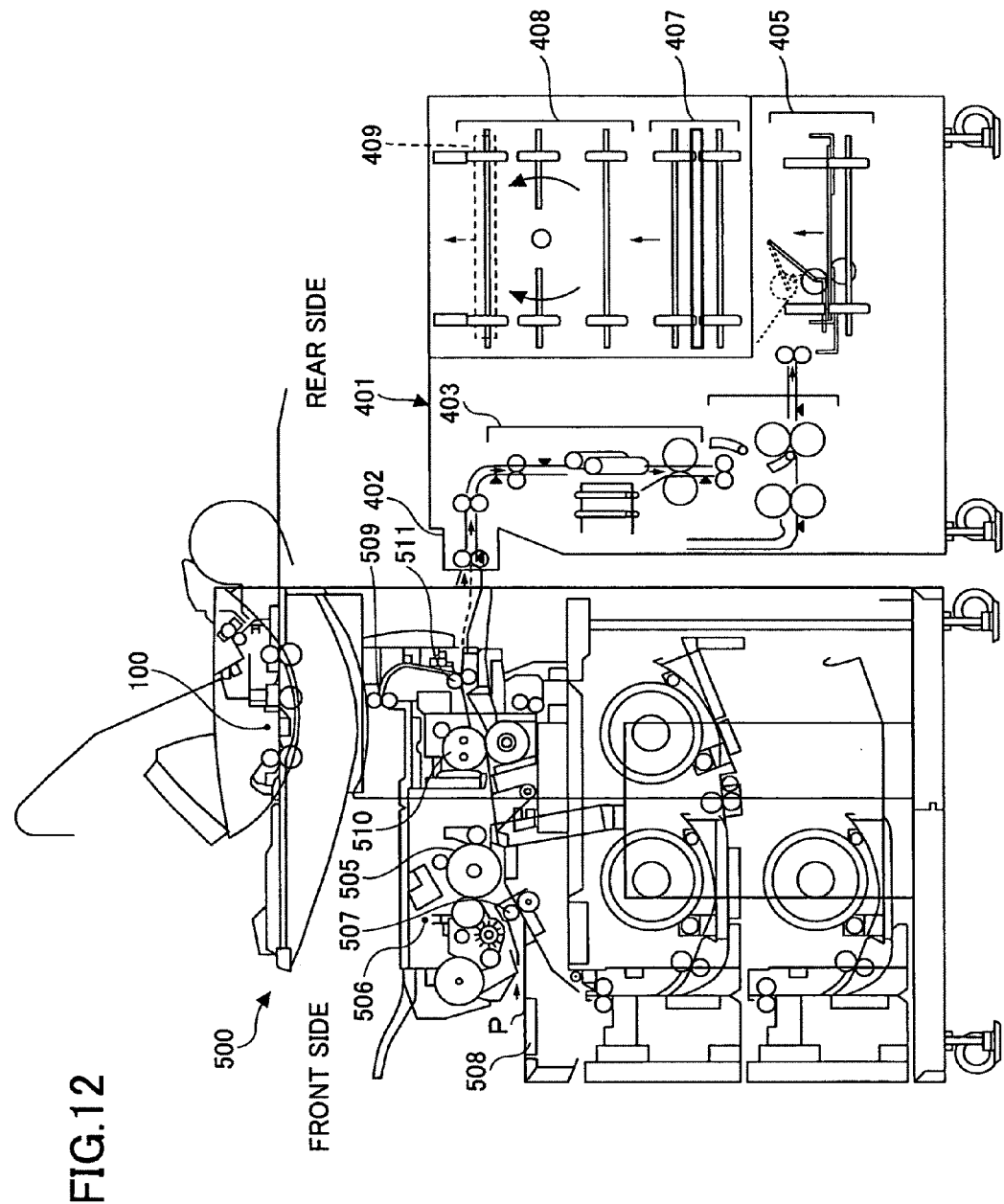
FIG. 12 depicts the entirety of a system in an embodiment 1.

FIG. 12 depicts the entirety of a system in the embodiment 1.

This system is an image forming apparatus configured for a wide size of paper, including a copier apparatus body 500 and a paper folding apparatus 401 connected to a rear side of the copier apparatus body 500.

The paper folding apparatus 401 carries out end face folding and accordion folding of paper. The paper folding apparatus 401 includes a joint part 402 to connect to the copier apparatus body 500, an edge folding part 403 for folding an edge of paper, an accordion folding part 404 for carrying out accordion folding along a paper conveyance direction, a conveyance switching devise 405 for switching a conveyance direction by 90°, a cross folding device (not shown), a reversing device 407 for reversing paper upside down, a rotating device 408 for rotating paper by 90° to switch an A4 length mode into an A4 width mode, and a tray 409 for ejecting folded paper and stacking the paper.

In the copier apparatus body 500, the image reading apparatus 100 is provided. Also, a manual paper feeding table 508 is provided in a bottom part of the copier apparatus body 500. When a user sets paper in the manual paper feeding table 508, the paper is then temporarily stopped by a registration roll 507, and then, is provided to an image forming unit 506 with timing being adjusted.

In the image forming unit 506, a latent image corresponding to image data provided by the image reading apparatus 100 is formed on a photosensitive member 505. The latent image is then developed by toner, the thus-obtained toner image is then transferred to the paper, and a fixing device 510 fixes the toner image onto the paper.

The paper on which the toner image is thus fixed and thus recorded is ejected to the paper folding apparatus 401 when paper folding should be carried out on the paper, by means of a recorded paper ejecting role 511.

On the other hand, when paper folding should not be carried out, a switching claw (not shown) and an upper paper ejecting roller 509 feed the paper to the inside of the copier apparatus body 500. When the paper is folded, the recorded paper ejecting roll 511 feeds the paper to the paper folding apparatus 401 as mentioned above. When edge folding is to be carried out, a corner of the paper is folded by the edge folding part 403.

After the edge is folded by the edge folding part 403, the paper undergoes accordion folding by the accordion folding part 404, and then, is fed to the conveyance switching device 405. The conveyance switching device 405 changes a conveyance direction, the cross folding device folds the paper in a short width direction, the reversing device 407 reverses the paper upside down, and then, the rotating device 408 rotates the paper direction, to stack the paper in the tray 409. The above-mentioned image reading apparatus 100 is used in this image forming apparatus configured for a wide size of paper.

<Embodiment 2>

The embodiment 2 will now be described.

For descriptions of configurations the same as those of the embodiment 1 described above will be appropriately omitted.

Figure 13:
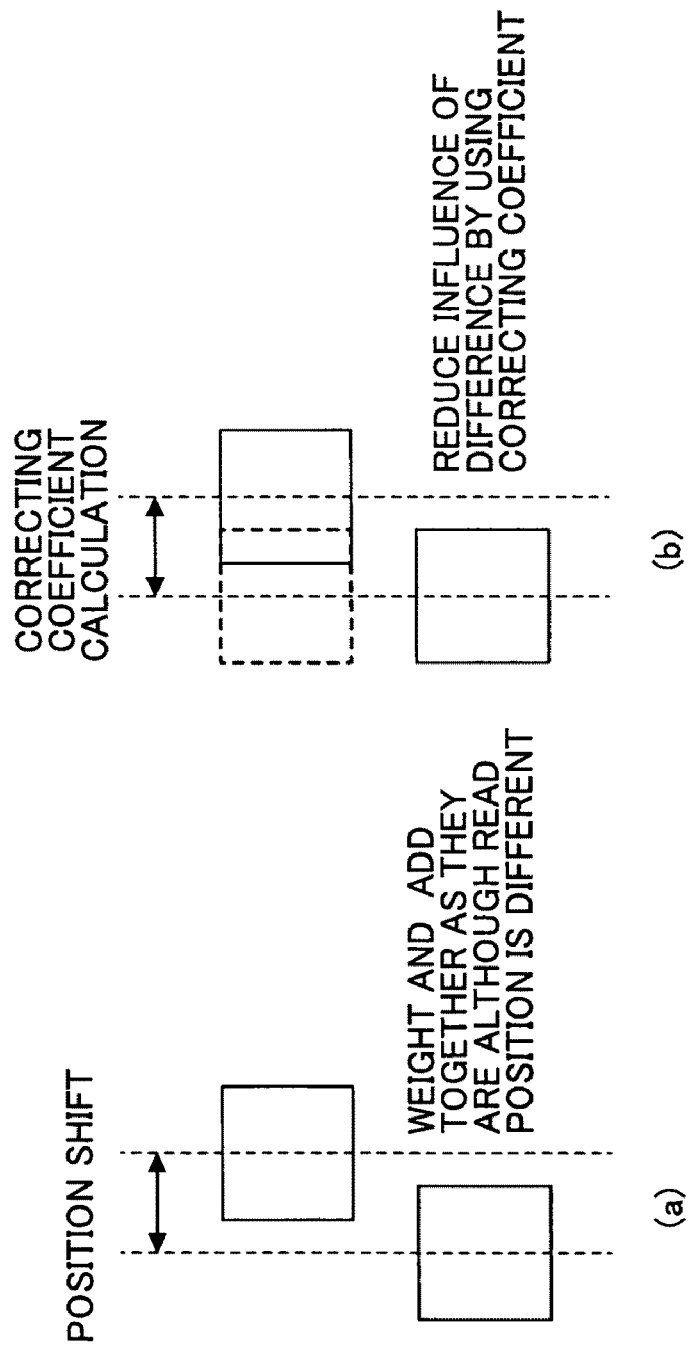
FIG. 13, (a) depicts a rough view of a correcting process in the related art, and (b) depicts a rough view of a correcting process in the embodiment.

For example, in a joint part correcting process described in the patent document 3, for overlapped parts of adjacent image sensors, when a position shift occurs in the image sensor, pixel values for different pixels are added after being weighted between the respective image sensors (see FIG. 13, (*a*)). As a result, especially for a case of a halftone dot area, a tone may reduce or a faint or patchy phenomenon may occur at the overlapped parts. In the embodiment 2, in order to avoid such a problematic phenomenon, as shown in FIG. 13, (*b*), correcting operation is carried out. Thereby, for overlapped parts between adjacent image sensors, when pixel values of different pixels are weighted and added together between the image sensors because of a position shift of the image sensor, an influence of the position shift can be reduced in a joint part correcting process.

FIG. 13, (*a*) depicts a correcting process in the prior art. FIG. 13, (*b*) depicts a correcting process in the embodiment 2. In cases of FIGS. 13, (*a*) and (*b*), in overlapped parts between adjacent image sensors, with respect to the image sensor having a pixel indicated by a lower square, the image sensor having a pixel indicated by an upper square shifts relatively in a right direction, as indicated by "POSITION SHIFT" in FIG. 13, (*a*). As a result of the position shift, the image sensor having shifted relatively in the right direction reads from a position which is shifted in the right direction from a position from which the other image sensor reads. In the case of FIG. 13, (*a*), the pixel values read from these different positions are added together after being weighted. As a result, as mentioned above, especially for a case of a halftone dot area, a tone may reduce or a faint or patchy phenomenon may occur at the overlapped parts. In contrast thereto, in the embodiment 2, as depicted in FIG. 13, (*b*), as the pixel value of the pixel of the image sensor having shifted relatively in the right direction, a pixel value from the same position as the position the other image sensor reads is calculated. Thus, a value of an expected pixel is calculated. Then, the value of the expected pixel is used as the pixel value of the pixel of the image sensor having shifted relatively in the right direction, and is used to add together with the value of the pixel of the other image sensor, after both being weighted. Thereby, the above-mentioned problem is solved.

Figure 14:
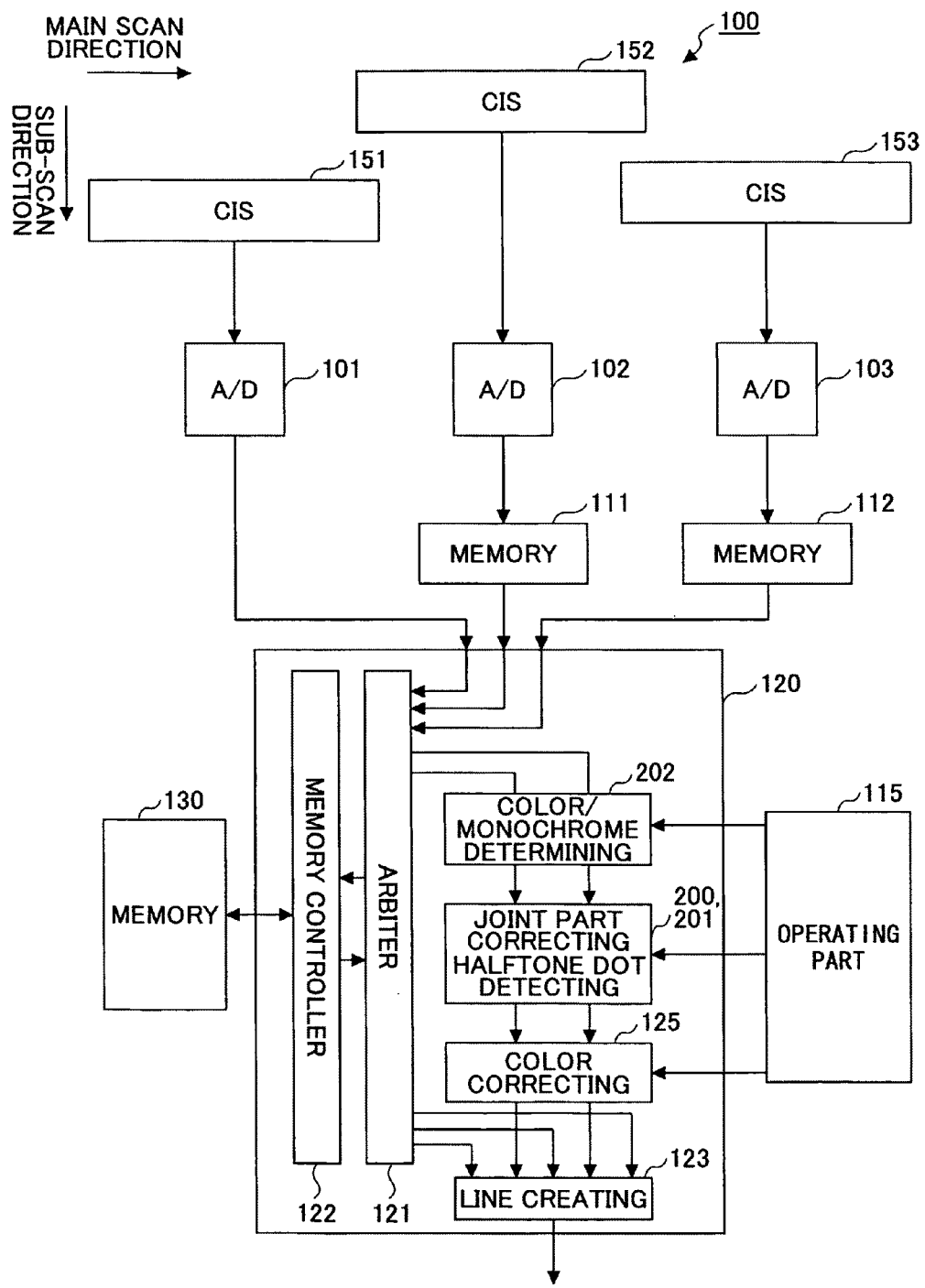
FIG. 14 depicts a rough block diagram of an image reading apparatus in an embodiment 2.

FIG. 14 depicts a block diagram roughly depicting an image reading apparatus in the embodiment 2.

This image reading apparatus 100 in the embodiment 2 is such that, an arbiter 121 and a memory controller 122 are provided in the line combining part 120 of the embodiment 1. To a memory 130, the memory controller 122 is connected, and the memory controller 122 carries out information transfer with the arbiter 121 in both directions. To the arbiter 121, read image data read by the first image sensor 151 via the first A/D controller 101, read image data read by the second image sensor 152 via the first memory 111 and read image data read by the third image sensor 153 via the second memory 112, are input.

From the arbiter 121, the read image data stored in the memory 130 is provided to the color/monochrome determining part 202, the joint part correcting circuit 200, the halftone dot detecting circuit 201, the color correcting circuit 125 and the line creating circuit 123.

That is, the read image data read by the three image sensors 151, 152 and 153 is input to the line combining circuit 120 simultaneously, and is temporarily stored in the memory 130 via the arbiter 121.

Then, from the memory 130, the image data other than the image data of the overlapped parts is sent to the line creating circuit 123 for the purpose of creating a complete line of read image data. On the other hand, from the memory 130, the image data of the overlapped parts is sent to the joint part correcting circuit 200. It is noted that, by means of the arbiter 121, the memory controller 122 and the memory 130, the image data read by the image sensors 151, 152 and 153 is transferred to the color/monochrome determining part 202 or to the line creating part 123 in appropriate timing. Especially, as the image data of the overlapped parts between adjacent image sensors, the image data of the overlapped parts between the adjacent image sensors 151 and 152, and the image data of the overlapped parts between the adjacent image sensors 152 and 153, is transferred to the color/monochrome determining part 202 at different timing, and then, is processed by the joint part correcting circuit 200 separately in a time shift manner. That is, at one timing, the image data of the overlapped parts between the image sensors 151 and 152 is processed by the joint part correcting circuit 200 as image data D4 and D5 depicted in FIG. 14. Similarly, at other timing, the image data of the overlapped parts between the image sensors 152 and 153 is processed by the joint part correcting circuit 200 as image data D4 and D5 depicted in FIG. 14. In the embodiment 2, only two parallel circuits are provided, i.e., to include the two cubic convolution parts 230 and 231, the two multiplying circuits 220 and 221, and so forth. However, the same function as that of the embodiment 1 having the three parallel circuits including the three cubic convolution parts 230, 231 and 232, the three multiplying circuits 220, 221 and 222, and so forth, can be provided by means of the functions of the arbiter 121, the memory controller 122 and the memory 130 to control or adjust timing to provide the image data of the three image sensors 151, 152 and 153.

Figure 15:
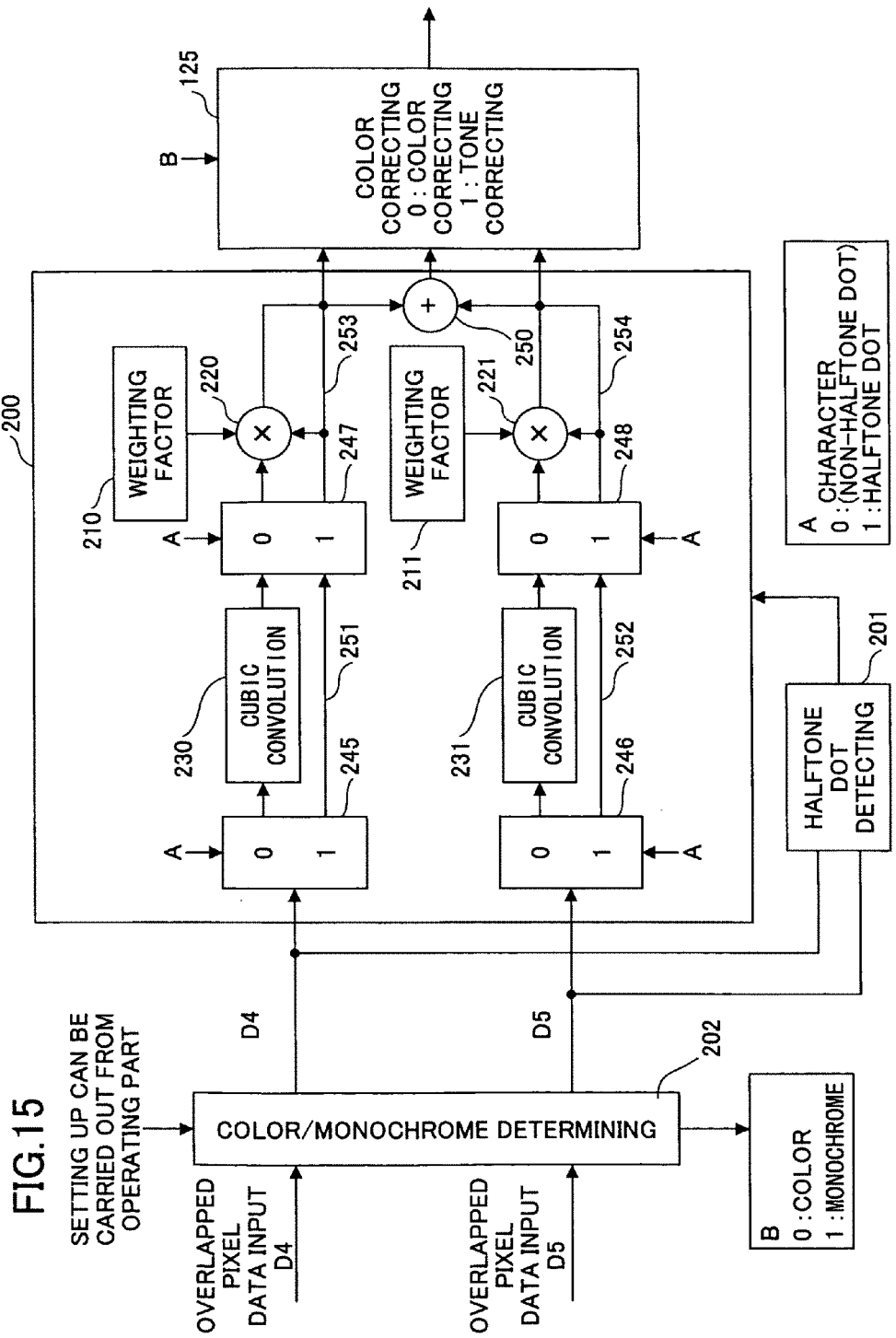
FIG. 15 depicts a block diagram of details of a color/monochrome determining part, a joint part correcting circuit, a color correcting part and a halftone dot detecting circuit.

FIG. 15 depicts one example of details of the color/monochrome determining part 202, the joint part correcting circuit 200, the color correcting part 125 and the halftone dot detecting circuit 201.

In FIG. 15, the joint part correcting circuit 200 includes the first and second cubic convolution parts 230 and 231, first and second weighting factor parts 210 and 211, the first and second multiplying circuits 220 and 221, first and second selectors 245 and 246 provided before the first and second cubic convolution parts 230 and 231, and third and fourth selectors 247 and 248 provided between the first and second cubic convolution parts 230 and 231 and the first and second multiplying circuits 220 and 221.

Further, in parallel to the first and second cubic convolution parts 230 and 231, first and second bypass circuits 251 and 252 are provided. Further, in parallel to the first and second weighting factor parts 210 and 211, third and fourth bypass circuits 253 and 254 are provided. To the adding circuit 250, values having being multiplied with weighting factors output by the first and second weighting factor parts 210 and 211 by the multiplying circuits 220 and 221, and outputs of the third and fourth bypass circuits 253 and 254, are provided, then are added together in an appropriate combination thereamong by the adding circuit 250, and an adding result is output from the adding circuit 250.

To the first and second selectors 245 and 246, the image data D4 and D5 of the overlapped parts between the adjacent image sensors 151 and 152 or the image data D4 and D5 of the overlapped parts between the adjacent image sensors 152 and 153, is input, respectively. For the image data, the color/monochrome determining part 202 carries out determination, and a result of the determination is reflected on a process carried out by the color correcting part 125.

After that, the image data is input also to the halftone dot detecting circuit 201, which determines whether the image data D4 and D5 is of a halftone dot area or a non-halftone dot area. Based on a result A of this determination, the first, second, third and fourth selectors 245, 246, 247 and 248 select a path to which the given image data is to be provided.

Thus, when the image data D4 and D5 is determined as of a non-halftone dot area (i.e., a character image area or such), a detection result "0" of the halftone dot detecting circuit 201 is provided. In each selector 245, 246, 247 and 248, the "0" is provided. As a result, selection of each selector 245, 246, 247 and 248 results in that a joint part correcting process is carried out on the image data D4 and D5. In the joint part correcting process, the cubic convolution parts 230 and 231 calculate values of expected pixels, the multiplying circuits 220 and 221 multiply weighting factors, the adding circuit 250 adds together, the image data D4 and the image data D5, which has been thus processed, the color correcting part 125 carries out a color correcting process, and thus, resulting image data is output as corrected image data. This joint part correcting process may be the same as the joint part correcting process described above for the embodiment 1.

A process of determining whether given image data is of a halftone dot area, carried out by the halftone dot detecting circuit 201, may be carried out for each line. When a detection result A of the halftone dot detecting circuit 201 is that image data is of a non-halftone dot area (i.e., a character image area or such) "0", the joint part correcting process may be carried out on the line. When a detection result A of the halftone dot detecting circuit 201 is that the image data is of a halftone dot area "1", the joint part correcting process may be bypassed. In this case, the process of calculating values of expected pixels in the cubic convolution parts 230 and 231 and the process of multiplying weighting factors in the multiplying circuits 220 and 221 may be omitted, and the line of image data may be directly sent to the adding circuit 250. In this case, any one of the image data D4 and the image data D5 of the overlapped parts is selected as image data of the overlapped parts, and is used for creating a complete line of image data in the line creating part 123.

However, a configuration may be made such that, regardless of a detection result of the halftone dot detecting circuit 201, setting in a register controls the selectors 245, 246, 247 and 248 to determine whether the joint part correcting process is carried out. A specific method to calculate values of expected pixels according to the cubic convolution method by the cubic convolution parts 230 and 231 and a specific method to select weighting factors and multiply the selected weighting factors by the multiplying circuits 220 and 221 may be identical to those used in the embodiment 1 described above.

Thus, in the embodiment 2, when given image data of the overlapped parts is of a non-halftone dot area (i.e., a character image area or such), the cubic convolution method is used to calculate values of expected pixels, arbitrary weighting factors are selected to multiply the image data, and then, the adding process is carried out to add the image data of the overlapped parts of the adjacent image sensors together.

A configuration may be provided such that, on the other hand, when given image data is of a halftone dot area, for each line, it is determined whether the joint part correcting process is carried out or the joint part correcting process is bypassed, and after that, the adding process is carried out to obtain corrected image data. Details will be described later.

A general method to calculate values of expected pixels carried out by the cubic convolution parts 230 and 231 is identical to that described above with reference to FIGS. 3-6 for the embodiment 1, and duplicate description thereof will be omitted.

A specific method to calculate values of expected pixels carried out in the joint part correcting circuit 200 according to the cubic convolution method will be described now.

When a determination result of the halftone dot detecting circuit 201 is that given image data is of a non-halftone dot area (i.e., a character area or such), the same as in the embodiment 1, 128 pixels (it is noted that the actual number of pixels may be arbitrarily selected from 8, 16, 32, 64, 128 and 256) are set as pixels of each overlapped part, and, the above-mentioned same correction coefficients of r(CODE) (see FIG. 5) are used for each of 8 units of pixels (each unit having 16 pixels), obtained from dividing the above-mentioned 128 pixels by 8, according to the above-mentioned formula (1).

It is noted that, if the same r(CODE) correcting coefficients are used throughout all the units of pixels of the overlapped parts in the formula (1) to obtain values of expected pixels, a gap may occur in resulting image data at a boundary between the overlapped parts and the other parts of the image sensors. In order to reduce such a gap, the correcting coefficients used in the formula (1) to calculate values of expected pixels for each unit of pixels are selected such that, a relationship holds between (i) the relative actual shift amount in the main scan direction between the adjacent image sensors (in FIG. 16, indicated as MAIN SCAN DIRECTION SHIFT AMOUNT), (ii) each image sensor (in FIG. 16, indicated as CIS) and (iii) the correcting coefficients to be actually used. Thus, as depicted in FIG. 16, values of the correcting coefficients to be actually used are changed step by step with respect to an actual shift amount of the image sensor less than an amount corresponding to one pixel.

FIG. 16 depicts one example of a table of the correcting coefficients with respect to the above-mentioned actual main scan direction shift amount.

Description of the table depicted in FIG. 16 will now be made for a case where an actual main scan shift amount is 4/8 pixel, for example.

As depicted in FIG. 16, in the case where the main scan direction shift amount is 4/8 pixel (corresponding to a line in the table of FIG. 16 of "±4/8"), the correcting coefficients of r0, r1, r1, r2, r2, r3, r3 and r4 are used for the respective 8 units of pixels (each unit having 16 pixels as maintained above) from the left for the 128 pixels of the overlapped part of the image sensor 151. Similarly, the correcting coefficients of r4, r3, r3, r2, r2, r1, r1 and r0 are used for the respective 8 units of pixels from the left for the 128 pixels of the overlapped part of the image sensor 152. It is noted that, the correcting coefficients of r0, r1, r2, . . . , r7 respectively mean the correcting coefficients of the respective lines of 0, 1, 2, 3, . . . , 7 of r (CODE), DECIMAL EXPRESSION of FIG. 5. That is, for example, the correcting coefficients of r1 are those used in the above-mentioned formula (1) for obtaining a value of an expected pixel basically when a main scan direction shift amount is 1/8 pixel. By adopting the method of selecting the correcting coefficients with the use of the table of FIG. 16, it is possible to reduce a gap otherwise occurring in resulting image data at a boundary between the overlapped part and the other part in each image sensor. This point will now be described in further detail with reference to FIG. 17.

Figure 17:
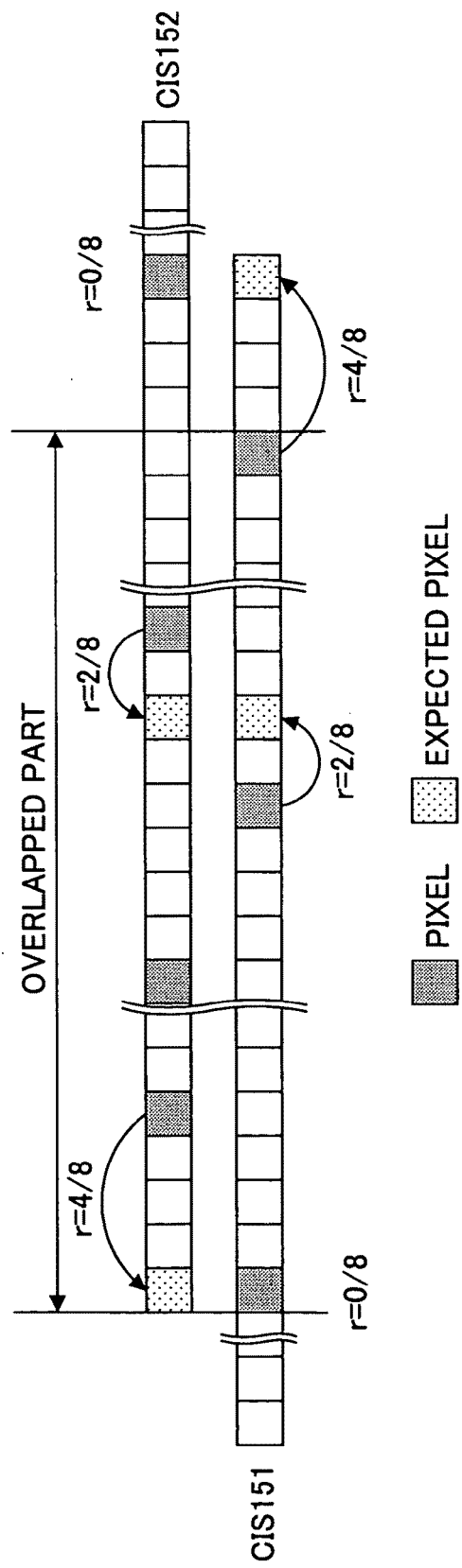
FIG. 17 illustrates how to obtain a value of an expected pixel for a case where a main scan direction shift amount is 4/8 pixel, which is 4/8 of a predetermined distance between adjacent pixels in the main scan direction and is less than an amount corresponding to a pixel, i.e., less than the predetermined distance between adjacent pixels.
Figure 18:
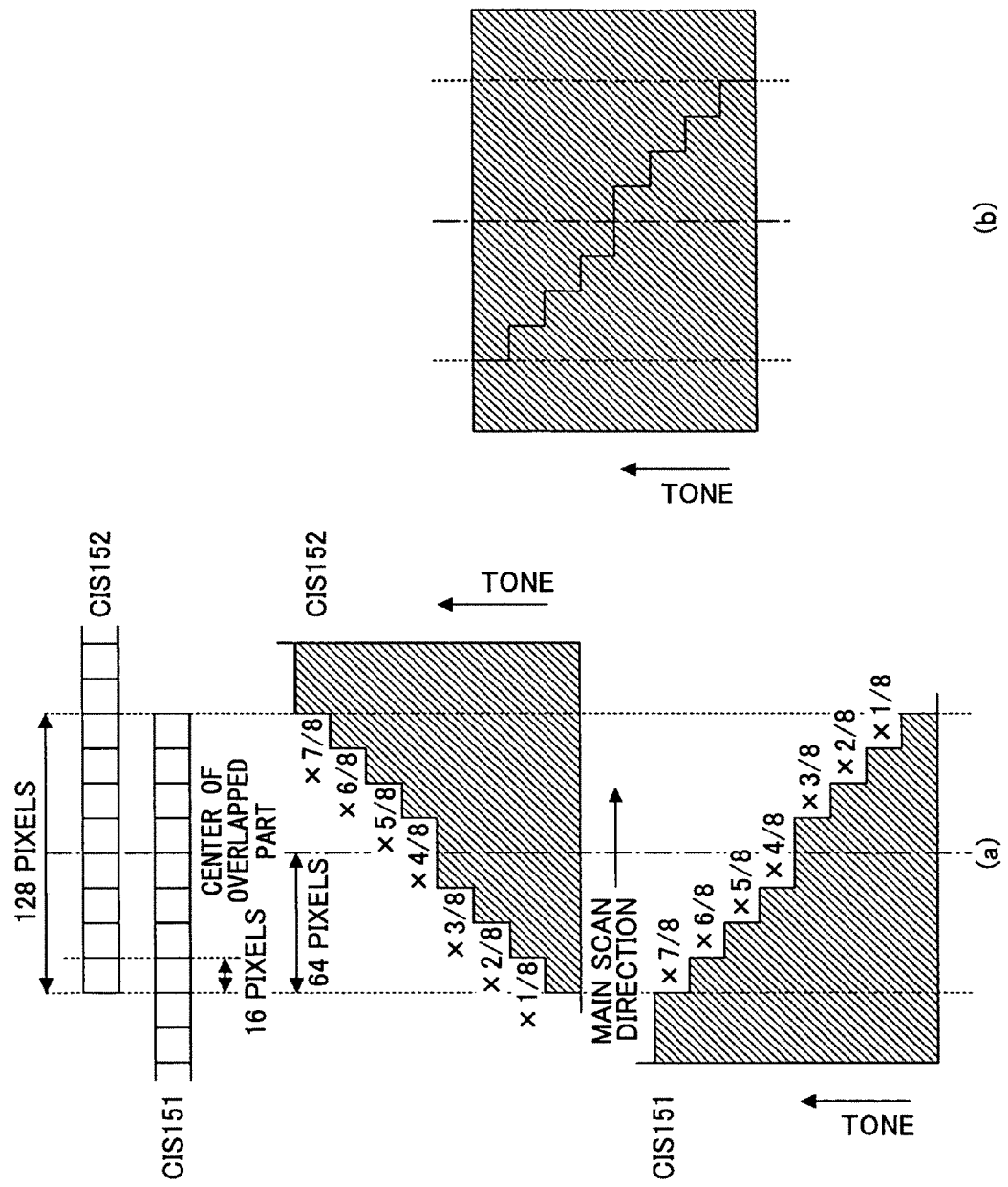
FIGS. 18, (a), (b) illustrates one example of weighting factor calculation.
Figure 19:
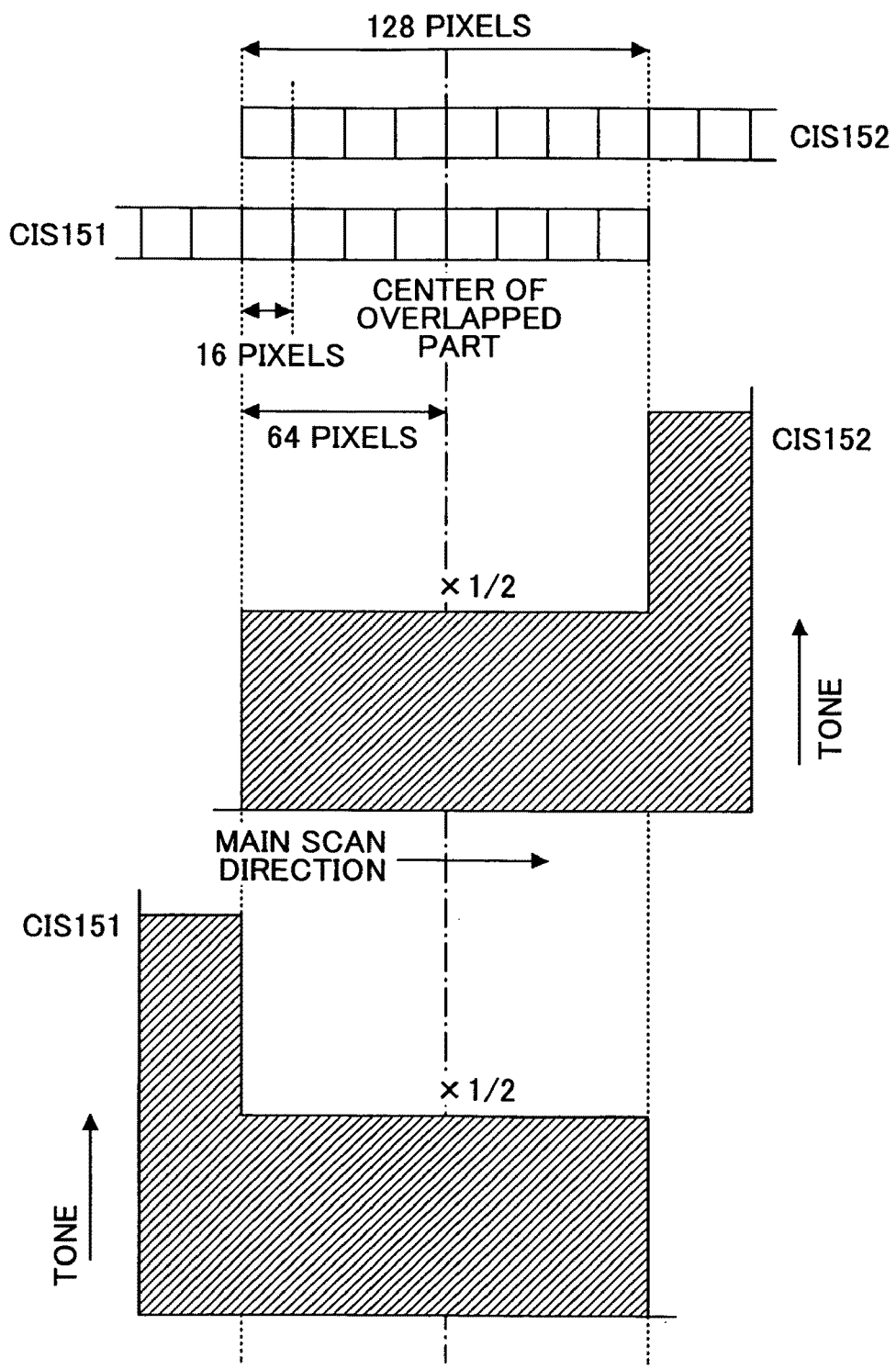
FIG. 19 illustrates another example of weighting factor calculation.

FIG. 17 illustrates a method of correcting pixel values of the overlapped parts of the image sensors with the use of the table of FIG. 16 for the case where the actual main scan direction shift amount is 4/8 pixel. FIGS. 18, (*a*) and (*b*) illustrates an example of multiplying weighting factors by the multiplying circuits 220 and 221. FIG. 19 illustrates another example of multiplying weighting factors by the multiplying circuits 220 and 221.

In FIG. 17, a range indicated as OVERLAPPED PART means a range of the adjacent image sensors 151 and 152 overlap together in the main scan direction, i.e., a right direction. Further, in FIG. 17, each square indicates a range of 1/8 pixel. In this case, the image sensor 151 has a position shift in a direction opposite to the main scan direction, i.e., the left direction, with respect to the image sensor 152, by a shift amount of 4/8 pixel, corresponding to four squares. Therefore, in FIG. 17, four squares at the right end of the image sensor 151 indicate a position of the right end of the image sensor 151 in a case where the above-mentioned position shift did not occur. In FIG. 17, in the image sensor 151, the correcting coefficients of r4 are used, as depicted in FIG. 16, for the unit of pixels at an end portion, i.e., the right end of the OVERLAPPED PART. That is, a value of an expected pixel for basically correcting a shift amount of 4/8 pixel is obtained, and the thus-obtained value of the expected pixel is used as the pixels of this unit of pixels. On the other hand, in the image sensor 151, the correcting coefficients of r0 are used, as depicted in FIG. 16, for the unit of pixels at a base portion, i.e., the left end of the OVERLAPPED PART. That is, a value of an expected pixel for basically correcting a shift amount of 0/8 pixel (i.e., no shift amount) is obtained, and the thus-obtained value of the expected pixel is used as the pixels of this unit of pixels. Further, the correcting coefficients of r2 are used, as depicted in FIG. 16, for the unit of pixels at an intermediate portion, i.e., the center of the OVERLAPPED PART between the end portion and the base portion. That is, a value of an expected pixel for basically correcting a shift amount of 2/8 pixel is obtained, and the thus-obtained value of the expected pixel is used as the pixels of this unit of pixels.

The same as in the image sensor 152 depicted in FIG. 17, the correcting coefficients of r4 are used, as depicted in FIG. 16, for the unit of pixels at an end portion, i.e., the left end of the OVERLAPPED PART. That is, a value of an expected pixel for basically correcting a shift amount of 4/8 pixel is obtained, and the thus-obtained value of the expected pixel is used as the pixels of this unit of pixels. On the other hand, in the image sensor 152, the correcting coefficients of r0 are used, as depicted in FIG. 16, for the unit of pixels at a base portion, i.e., the right end of the OVERLAPPED PART. That is, a value of an expected pixel for basically correcting a shift amount of 0/8 pixel (i.e., no shift amount) is obtained, and the thus-obtained value of the expected pixel is used as the pixels of this unit of pixels. Further, the correcting coefficients of r2 are used, as depicted in FIG. 16, for the unit of pixels at an intermediate portion, i.e., the center of the OVERLAPPED PART between the end portion and the base portion. That is, a value of an expected pixel for basically correcting a shift amount of 2/8 pixel is obtained, and the thus-obtained value of the expected pixel is used as the pixels of this unit of pixels.

Thus, the method of correcting for each pixel in the overlapped parts in which the reading parts of the image sensors overlap together is determined in such a manner that, from the base portion through the end portion of the overlapped part of each image sensor, the basic position shift amount to be corrected gradually increases.

After thus obtaining values of expected pixels with the use of the formula (1) according to the cubic convolution method as depicted in FIG. 17, weighting factors are multiplied by the multiplying circuits 220 and 221 as depicted in FIGS. 18, (*a*) and (*b*). That is, for the above-mentioned 8 units of pixels of the overlapped part of the image sensor 151, weighting factors of 7/8, 6/8, . . . , 1/8 are multiplied in the stated order from the left, respectively. Similarly, for the 8 units of pixels of the overlapped part of the image sensor 152, weighting factors of 7/8, 6/8, . . . , 1/8 are multiplied in the stated order from the right. Thus, the weighting factors are determined in such a manner that, from the base portion through the end portion of the overlapped part of each image sensor in the main scan direction, the weighting factor decreases step by step.

Thereby, as a position approaches to the base portion of the overlapped part of the image sensor 151, the pixel value of the image sensor 151 has a larger weight factor multiplied (see FIG. 18, (a)). Similarly, as a position approaches to the base portion of the overlapped part of the image sensor 152, the pixel value of the image sensor 152 has a larger weight factor multiplied (see FIG. 18, (a)). Then, the image data of both pixels is combined together (see FIG. 18, (b)).

Further, as another way, it is also possible to determine the weighting factors in such a manner that, as depicted in FIG. 19, ½ of a weighting factor is used, and, this weighting factor is used to multiply the image data of each of the overlapped parts of both image sensors 151 and 152 by the multiplying circuits 220 and 221. Then, the image data is combined together. In this case, the outputs (tone values) of the image sensors 151 and 152 are thus averaged.

Figure 20:
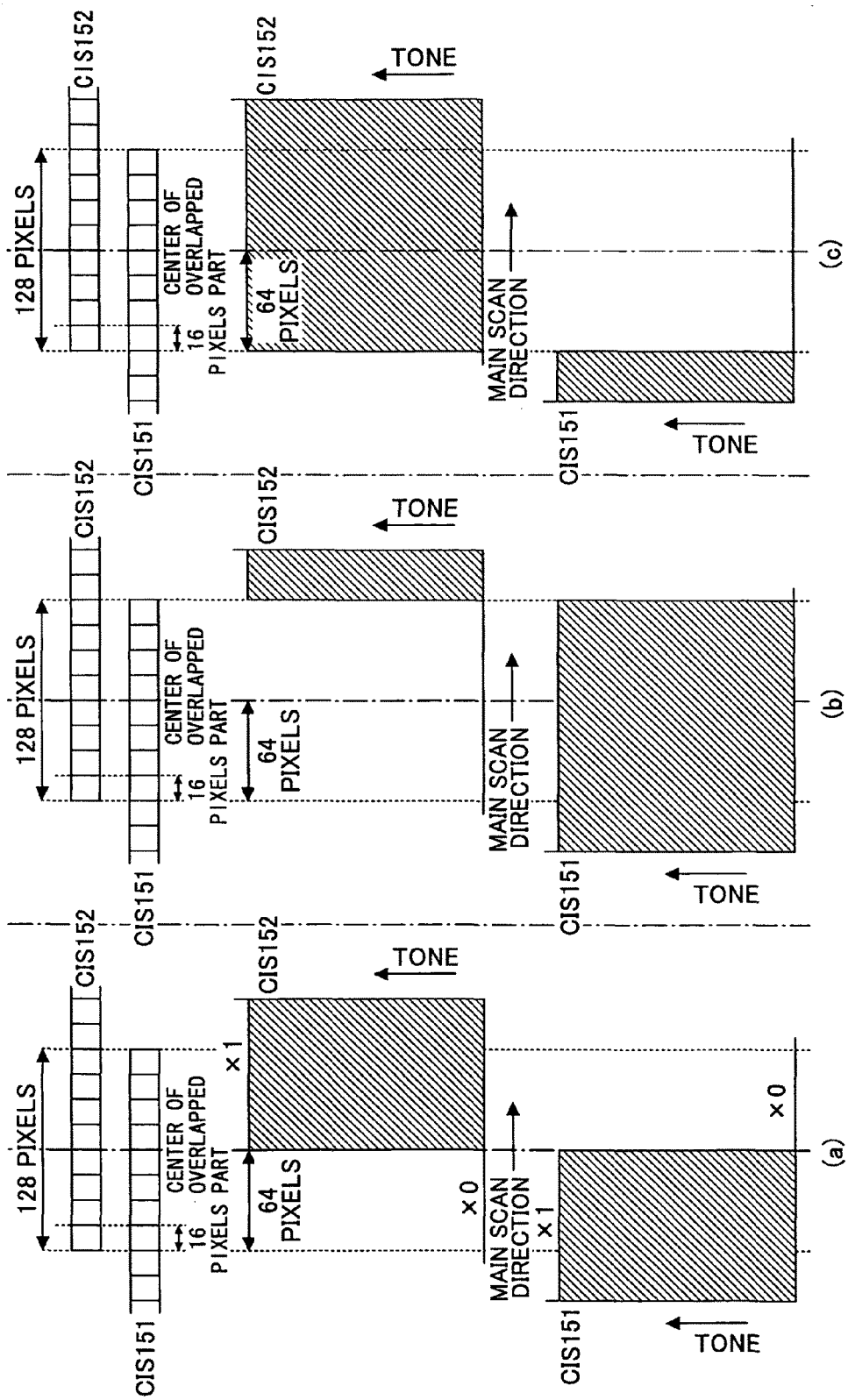
FIGS. 20, (a), (b) and (c) illustrates a case where weighting factor calculation is omitted.

Further, as depicted in FIG. 15, when "1" is selected in the selectors 247 and 248, a weighting process by the multiplying circuits 220 and 221 is omitted, and, as depicted in FIG. 20, (a), connection is carried out at the center of the overlapped parts of both image sensors 151 and 152. In the case of FIG. 20, (a), the output of the image sensor 151 is used for a left half side of the overlapped parts, while, the output of the image sensor 152 is used for a right half side of the overlapped parts. Alternatively, as depicted in FIGS. 20, (b) and (c), as image data of the overlapped parts, image data of any one of the image sensors 151 and 153 may be used. FIG. 20, (b) depicts a case where, as image data of the overlapped parts, image data of the image sensor 151 is used. FIG. 20, (c) depicts a case where, as image data of the overlapped parts, image data of the image sensor 152 is used.

After weighting factors are multiplied with by the multiplying circuits 220 and 221 as described above, image data of the overlapped parts of both image sensors 151 and 152 or image data of the overlapped parts of both image sensors 152 and 153 is added together by the adding circuit 250. After that, the same as in the embodiment 1, the color correcting part 125 compares image data of the overlapped parts before and after the joint part correcting process carried out by the joint part correcting circuit 200. Then, if necessary, a color correcting process is carried out. After that, image data of the other parts of the overlapped parts are provided by the arbiter 121, and is connected with image data of the overlapped parts output by the color correcting part 125, and thus, a complete line of image data is created.

In the embodiment 2, as image data of the overlapped parts is processed as mentioned above, it is possible to reduce a gap which may otherwise occur between a part for which a process of correcting for a position shift occurring in the overlapped parts between the image sensors 151 and 152 or the image sensors 152 and 153 is carried out and a part for which this process is not carried out, by changing the correcting method step by step along the main scan direction as mentioned above.

Figure 21:
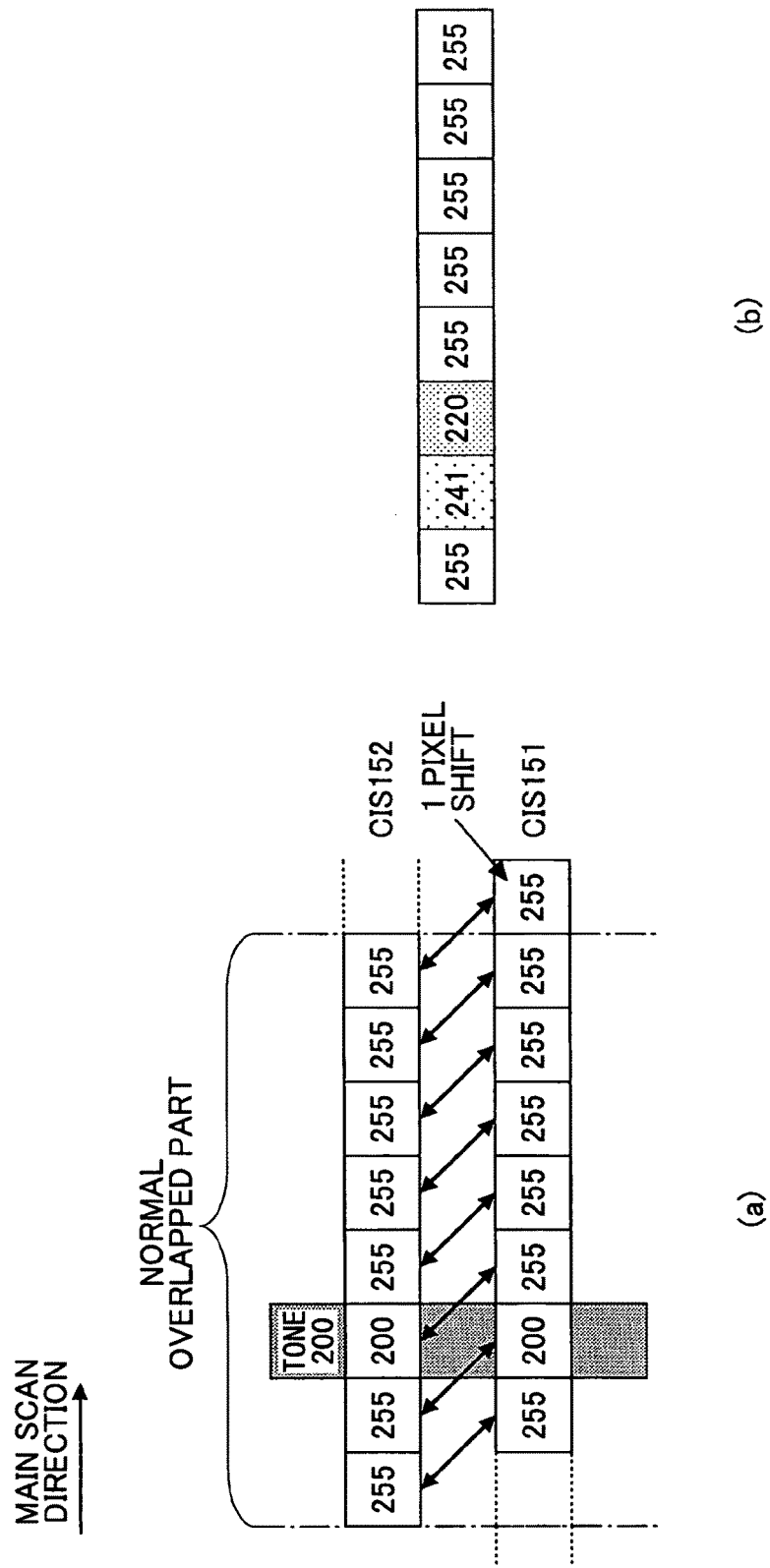
FIGS. 21, (a) and (b) illustrates a joint part correcting process, (a) depicts a state before weighting factor calculation process and (b) depicts a state after the weighting factor calculation process.

When the same process as that carried out on a non-halftone dot area (i.e., a character image area or such) is also carried on a halftone dot area, a halftone dot part may disappear when a position shift occurs in the image sensor. FIG. 21 illustrates such a situation. In FIG. 21, (a), an upper part depicts the image sensor 151 and a lower part depicts the image sensor 152, and in particular, FIG. 21, (a) depicts the overlapped parts thereof. Each square in FIG. 21, (a) represents one pixel, and a value inside of the square indicates a pixel value. As the pixel value is larger, a tone of the pixel is lighter, that is, it approaches white. FIG. 21, (a) shows a case where the image sensor 151 has a position shift by one pixel relatively in a right direction, i.e., in the main scan direction, with respect to the image sensor 152. Further, in FIG. 21, (a), a vertically long solid rectangle on the left side represents a fine drawn line. A pixel value of the fine drawn line is 200, and thus, has a darker tone which is close to black. The other part (i.e., a background part) has a pixel value of 255, has a lighter tone, which is close to white. When the above-mentioned position shift of the image sensor 151 did not occur, as a pixel value of the fine drawn line, 200 is obtained from a corresponding pixel of each of the image sensors 151 and 152, is weighted by the weighting factor, and added together between the overlapped parts of the image sensors 151 and 152. However, as depicted in FIG. 21, (a), as a result of the above-mentioned position shift of the image sensor 151, a pixel next on the left side to a pixel which should originally read the fine drawn line actually reads the fine drawn line to have a pixel value of 200. On the other hand, the pixel which should originally reads the fine drawn line actually reads the background to have a pixel value of 255.

As a result, the pixel value 200 of the image sensor 152 obtained from reading the fine drawn line and the pixel value 255 of the image sensor 151 obtained from reading the background are added together after having the weighting factors multiplied. When the above-mentioned position shift did not occur, the pixel value 200 read by both the image sensors 151 and 152 are added together after having the weighting factors multiplied. In contrast thereto, because of the position shift, the above-mentioned pixel values 200 and 255 read by the respective image sensors 151 and 152 are added together after having the weighting factors multiplied. As a result, as depicted in FIG. 21, (b), a pixel value 220 is obtained for the corresponding pixel which is larger than the original pixel value 200 of the fine drawn line. As a result, the lighter tone than the original tone is obtained for the drawn fine line. Thus, as mentioned above, a halftone dot part may disappear, or a faint or patchy phenomenon may occur. When a position shift in a sub-scan direction additionally occurs, a corresponding image part may disappear.

FIGS. 21, (a) and (b) illustrates a joint part correcting process, FIG. 21, (a) depicts a state before weighting and adding processes, and FIG. 21, (b) depicts a state after the weighting and adding processes.

Therefore, when a determination result of the halftone dot detecting circuit 201 is that given image data is of a halftone dot area, the above-described method described with reference to FIGS. 7-10 for the embodiment 1 may be carried out. Alternatively, when a determination result of the halftone dot detecting circuit 201 is that given image data is of a halftone dot area, the above-described method described with reference to FIG. 11 for the embodiment 1 may be carried out.

As further another method, when a determination result of the halftone dot detecting circuit 201 is that given image data is of a halftone dot area, a method described now may be used.

That is, a determination of the halftone dot detecting circuit 201 is carried out for each line, and when a determination result of the halftone dot detecting circuit 201 is that given image data is of a halftone dot area, the selectors 245, 246, 247 and 248 are switched so that a process of obtaining values of expected pixels to be carried out by the cubic convolution parts 230 and 231 and a process of multiplying weighting factors to be carried out by the multiplying parts 220 and 221 are omitted. Then, after that, any one of the methods of FIGS. 20, (a), (b) and (c) is selected, as mentioned above. Alternatively, as mentioned above, when a determination result of the halftone dot detecting circuit 201 is that given image data is of a halftone dot area, the joint part correcting process may be carried out in a condition in which the number of pixels of the overlapped parts is reduced as depicted in FIG. 11.

Next, a method of determining whether given image data is of a halftone dot area or of a non-halftone dot area by the halftone dot detecting circuit 201 will be described.

Figure 22:
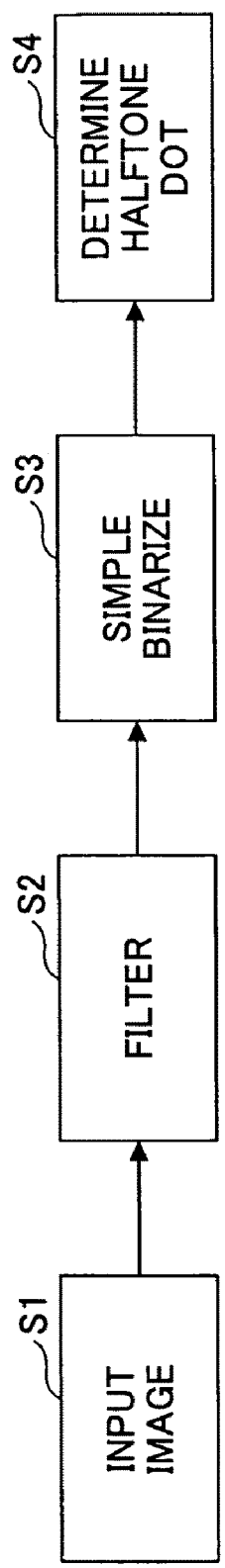
FIG. 22 depicts a flow chart for illustrating a halftone dot detecting procedure.

FIG. 22 is a flow chart of a process of detecting whether given image data is of a halftone dot area or of a non-halftone dot area, by the halftone dot detecting circuit 201.

In the process of FIG. 22, given data is passed through a filter (steps S1 and S2), and simple binarization is carried out (step S3).

After that, according to a designated determination criterion (described later), a determination is carried out (step S4). That is, in step S2, filter operation is carried out on the given image data with the use of the filter depicted in FIG. 23.

Figure 23:
FIG. 23 illustrates one example of a filter.

FIG. 23 illustrates one example of the filter.

Next, in step S3, simple binarization is carried out on the image data having undergone the above-mentioned filer operation. A quantizing threshold in the simple binarization is 128 when the image data is of 8 bits. A quantizing threshold in the simple binarization is 512 when the image data is of 10 bits. Then, when the number of changing points in the image data within a halftone dot determining target area is equal to or more than a predetermined value, it is determined that the image data is of a halftone dot area. When the number of changing points in the image data within the halftone dot determining target area is less than the predetermined value, it is determined that the image data is of a non-halftone dot area.

Figure 24:
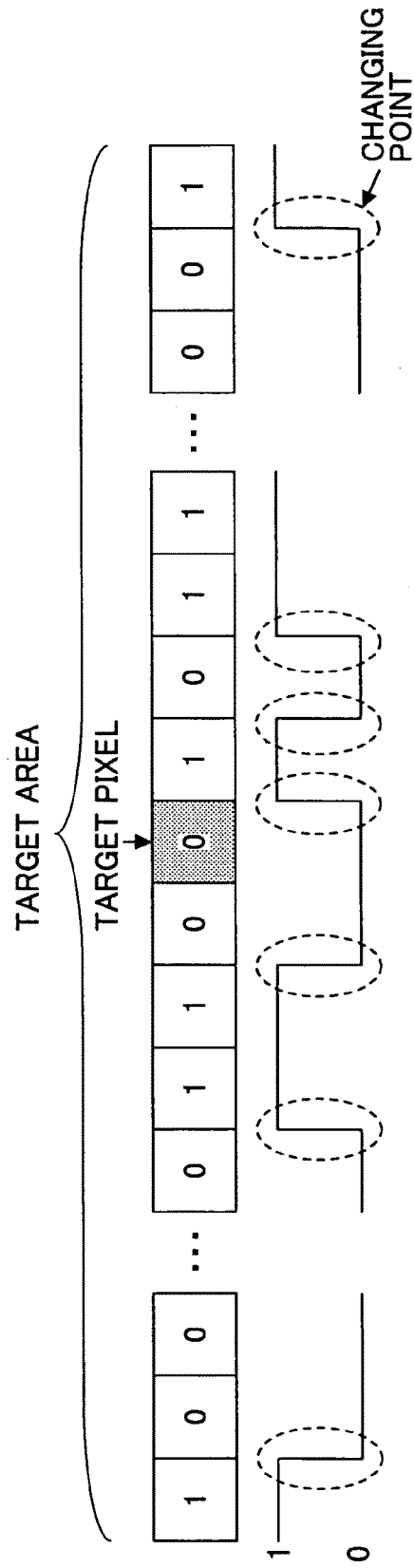
FIG. 24 illustrates a halftone dot determining target area.

It is noted that, the halftone dot determining target area includes a target pixel and adjacent 20 pixels on each of left and right sides of the target pixel, in a total of 41 points. As shown in FIG. 24, the halftone dot determining target area is set by the halftone dot detecting circuit 201. The above-mentioned predetermined value as a changing point threshold for determining whether given image data is of a halftone dot area, any one of 10, 11 and 12 may be selected, as depicted in FIG. 24. It is noted that, the above-mentioned quantizing threshold and the changing point threshold may be changed. Further, the above-described method of determining whether given image data is of a halftone dot area is well-known art. For this purpose, various methods are known, and thus, any method other than the method described above may be used instead. However, the above-mentioned method is advantageous because pattern matching should not be carried out, and thus, it is possible to detect halftone dots less expensively.

FIG. 24 depicts the halftone dot determining target area, and FIG. 25 depicts the changing point thresholds.

Figure 26:
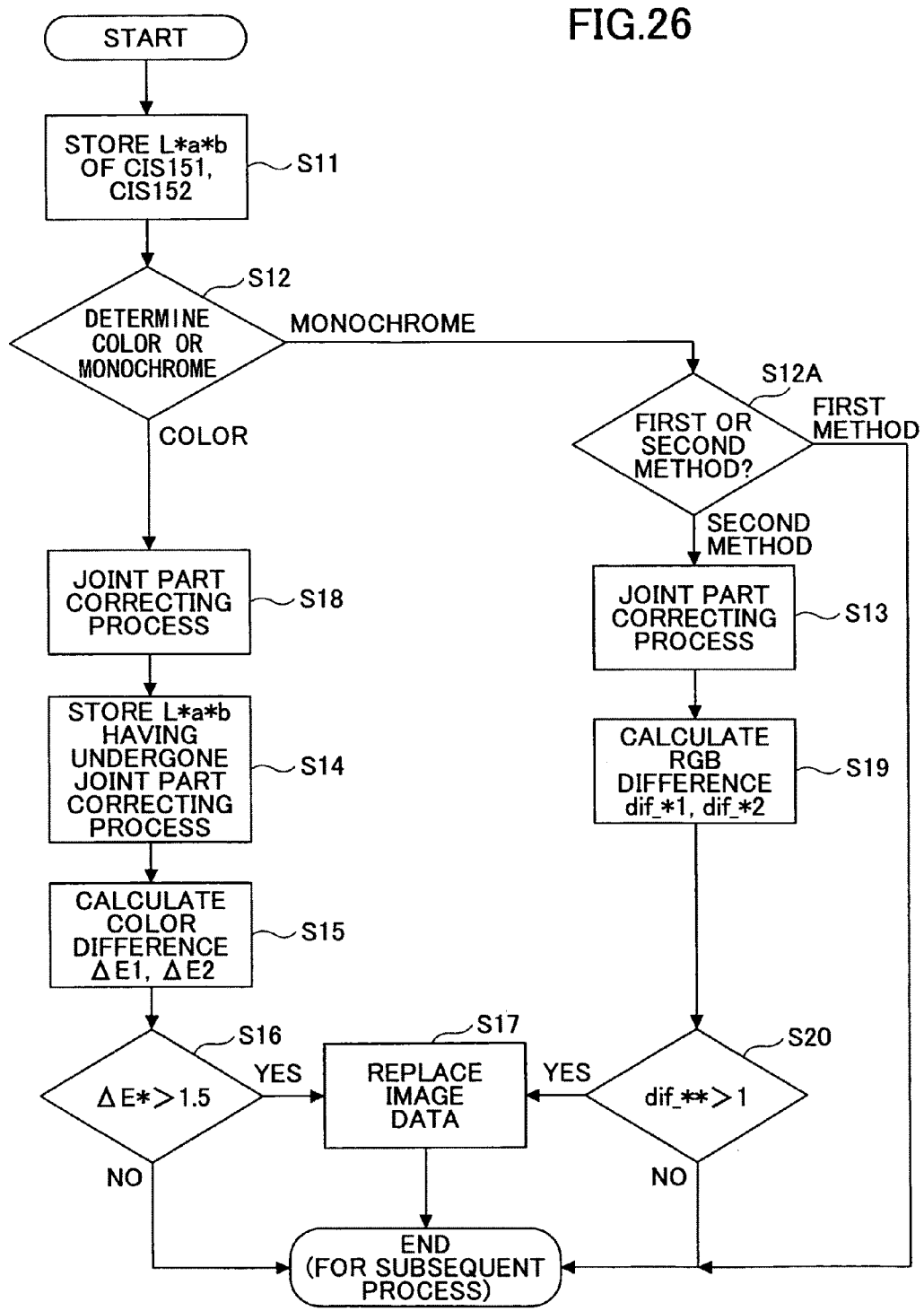
FIG. 26 depicts one example of a flow chart of color correcting.

FIG. 26 depicts one example of a flow chart for a color correcting process carried out by the color correcting part 125 depicted in FIG. 15.

In FIG. 26, first, values of L*a*b output from the image sensors 151 and 152 are stored in step S11.

Then, the color/monochrome determining part 202 determines whether the image data is of a color image or of a monochrome image in step S12.

When the image data is of a color image (in step S12, COLOR), a joint part correcting process for a color image, is carried out in step S18. When the image data is of a monochrome image (in step S12, MONOCHROME), a joint part correcting process for a monochrome image, is carried out in step S13. The joint part correcting process for a color image, means the above-mentioned joint part correcting process carried out by the joint part correcting circuit 200. On the other hand, the joint part correcting process for a monochrome image, may mean, the same as in the embodiment 1, any one of the following two methods to be selected.

That is, the first method (FIRST in step S12A) is a method by which, the image data does not undergo a process carried out by the joint part correcting circuit 200, and, is directly transferred to the line creating circuit 123. Then, any one of the image data coming from the overlapped parts of the adjacent image sensors 151 and 152 or the adjacent image sensors 152 and 153 is used, the line creating part 123 combines the image data with image data of the other parts, and thus, a complete line of image data is obtained. On the other hand, in the second method (SECOND in step S12A), the same as for a case where image data is of a color image, the image data undergoes the joint part correcting process carried out by the joint part correcting circuit 200.

In FIG. 26, in step S12A, it is determined whether the above-mentioned first method or second method is selected. The determining in step S12A may be made according to setting operation carried out by a user on the operating part 115 to select any one of the first and second methods.

Values of L*a*b of image data, determined as of a color image, and having undergone the joint part correcting processing for a color image, are stored. Then, from the stored values, color is calculated, and thus, the same as in the embodiment 1 described above, ΔE1 and ΔE2 are obtained in step S15.

Next, the same as in the embodiment 1, it is determined in step S16 whether at least ΔE1 or ΔE2 is larger than 1.5.

When at least ΔE1 or ΔE2 is larger than 1.5, image data before undergoing the process carried out by the joint part correcting circuit 200 of the image sensor having the smaller average of ΔE1 or ΔE2 is used as image data of the overlapped parts (YES in step S16, and step S17). It is noted that, the average of ΔE1 or ΔE2 may be an average of ΔE1 or ΔE2 with respect to all the pixels of the overlapped part or an average of ΔE1 or ΔE2 with respect to a predetermined range of the pixels of the overlapped part. On the other hand, when none of ΔE1 and ΔE2 is larger than 1.5, the current process is finished, and a subsequent process is carried out (NO in step S16). In the latter case, image data having undergone the process carried out by the joint part correcting circuit 200 is used.

When the above-mentioned second method is selected (SECOND in step S12A), image data determined as of a monochrome image in step S12 undergoes the joint part correcting process in step S13, i.e., as mentioned above, the process carried out by the joint part correcting circuit 200 the same as for a case where image data is of a color image. After that, the same as in the embodiment 1 described above, RGB differences are calculated, and thus, the above-mentioned dif_r1, dif_g1, dif_b1, dif_r2, dif_g2 and dif_b2 are obtained in step S19. Then, it is determined whether at least any one of dif_r1, dif_g1, dif_b1, dif_r2, dif_g2 and dif_b2 is larger than 1, in step S20. When at least any one of dif_r1, dif_g1, dif_b1, dif_r2, dif_g2 and dif_b2 is larger than 1 (YES in step S20), image data before undergoing the process carried out by the joint part correcting circuit 200 of the image sensor having the smaller average of dif_r1, dif_g1 and dif_b1, or dif_r2, dif_g2 and dif_b2 is used as image data of the overlapped parts. It is noted that, the average of dif_r1, dif_g1 and dif_b1, or dif_r2, dif_g2 and dif_b2 may be an average of dif_r1, dif_g1 and dif_b1, or dif_r2, dif_g2 and dif_b2 with respect to all the pixels of the overlapped part or an average of average of dif_r1, dif_g1 and dif_b1, or dif_r2, dif_g2 and dif_b2 with respect to a predetermined range of the pixels of the overlapped part. On the other hand, when none of dif_r1, dif_g1, dif_b1, dif_r2, dif_g2 and dif_b2 is larger than 1 (NO in step S20), the current process is finished, and a subsequent process is carried out. In the latter case, image data having undergone the process carried out by the joint part correcting circuit 200 is used.

<Embodiment 3>

An embodiment 3 will now be described.

Figure 27:
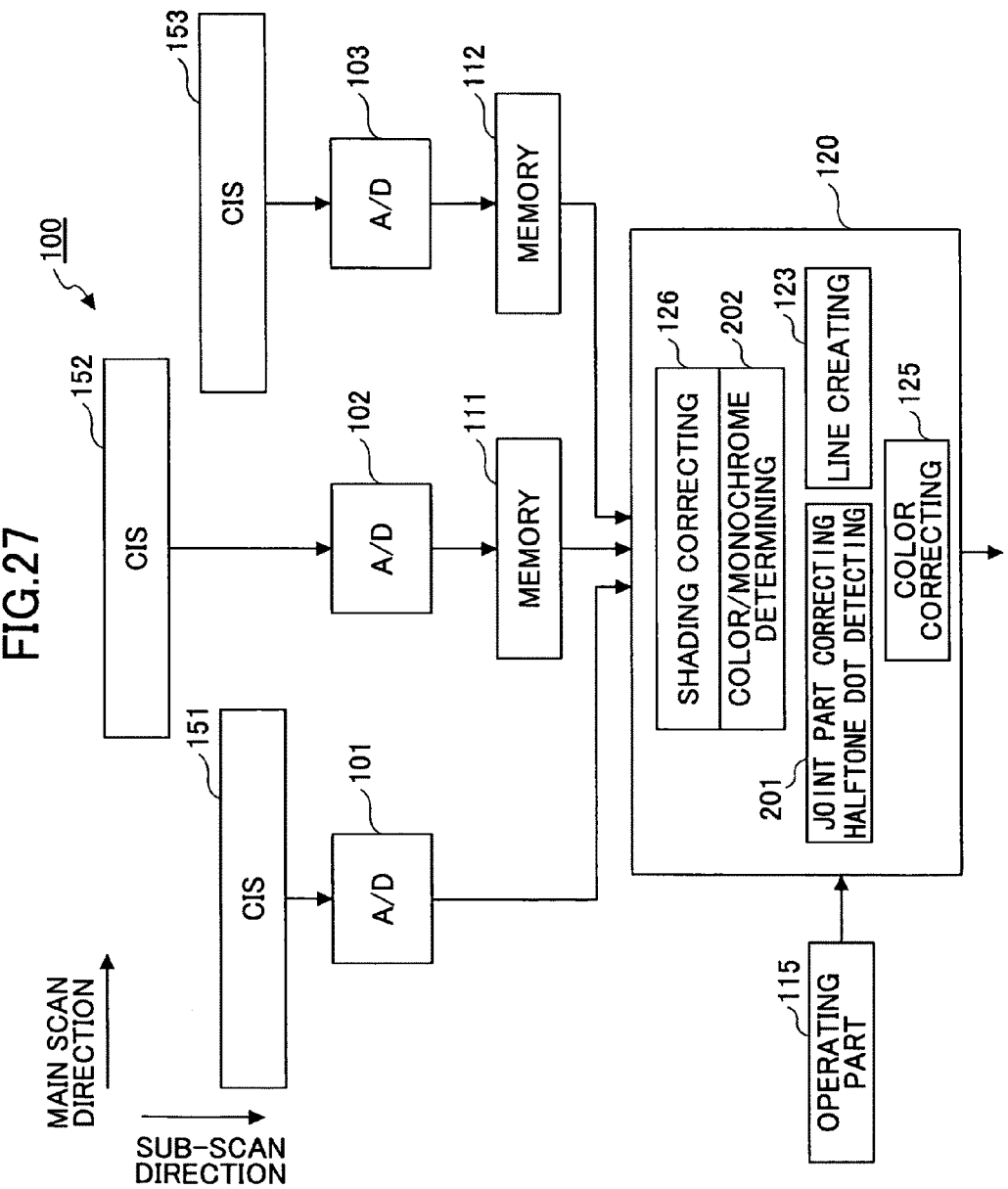
FIG. 27 depicts a rough block diagram of an image reading apparatus in an embodiment 3.

FIG. 27 is a block diagram roughly depicting an image reading apparatus in the embodiment 3.

The image reading apparatus in the embodiment 3 has, the same as in the embodiments 1 and 2 described above, three image sensors 151, 152 and 153, three A/D converters 101, 102 and 103, two memories 111 and 112 and a line combining part 120.

In the image reading apparatus 100, as in the embodiments 1 and 2, the three image sensors 151, 152 and 153 are disposed in such a manner that each pair of adjacent image sensors overlap in a main scan direction by a predetermined number of pixels to read an image. Further, the image sensor 152 is disposed on an upstream side in a sub-scan direction, the image sensors 151 and 153 are disposed on a downstream side at predetermined intervals in a staggering manner.

Image data output from the image sensor 151 is converted into a digital signal by means of the A/D converter 101, and is input to the line combining part 120. Image data output from the image sensors 152 and 153 is converted into respective digital signals by means of the A/D converters 102 and 103, is temporarily stored in the memories 111 and 112, respectively, for the purpose of delaying to adjust timing in the sub-scan direction. Then, after that, the digital signals thus stored in the memories 111 and 112, respectively, are transferred to the line combining part 120 with their timing adjusted.

It is noted that, because the image sensor 151 is located on the most downstream side in the sub-scan direction, thus should not be delayed, and as a result, is not stored in any memory, and is directly transferred to the line combining part 120 after being processed by the A/D converter 101.

On the other hand, the image sensor 153 is disposed on the upstream side of the image sensor 151 by several lines for the purpose of easy adjustment. Therefore, image data output from the image sensor 153 is stored temporarily in the memory 112.

In the line combining part 120, a shading correcting process, a process of correcting for overlapped parts, and a process of creating a complete line of image data from image data transferred in parallel from the image sensors 151, 152 and 153 are carried out, and then, the thus-obtained complete line of image data is transferred to a subsequent process.

Figure 28:
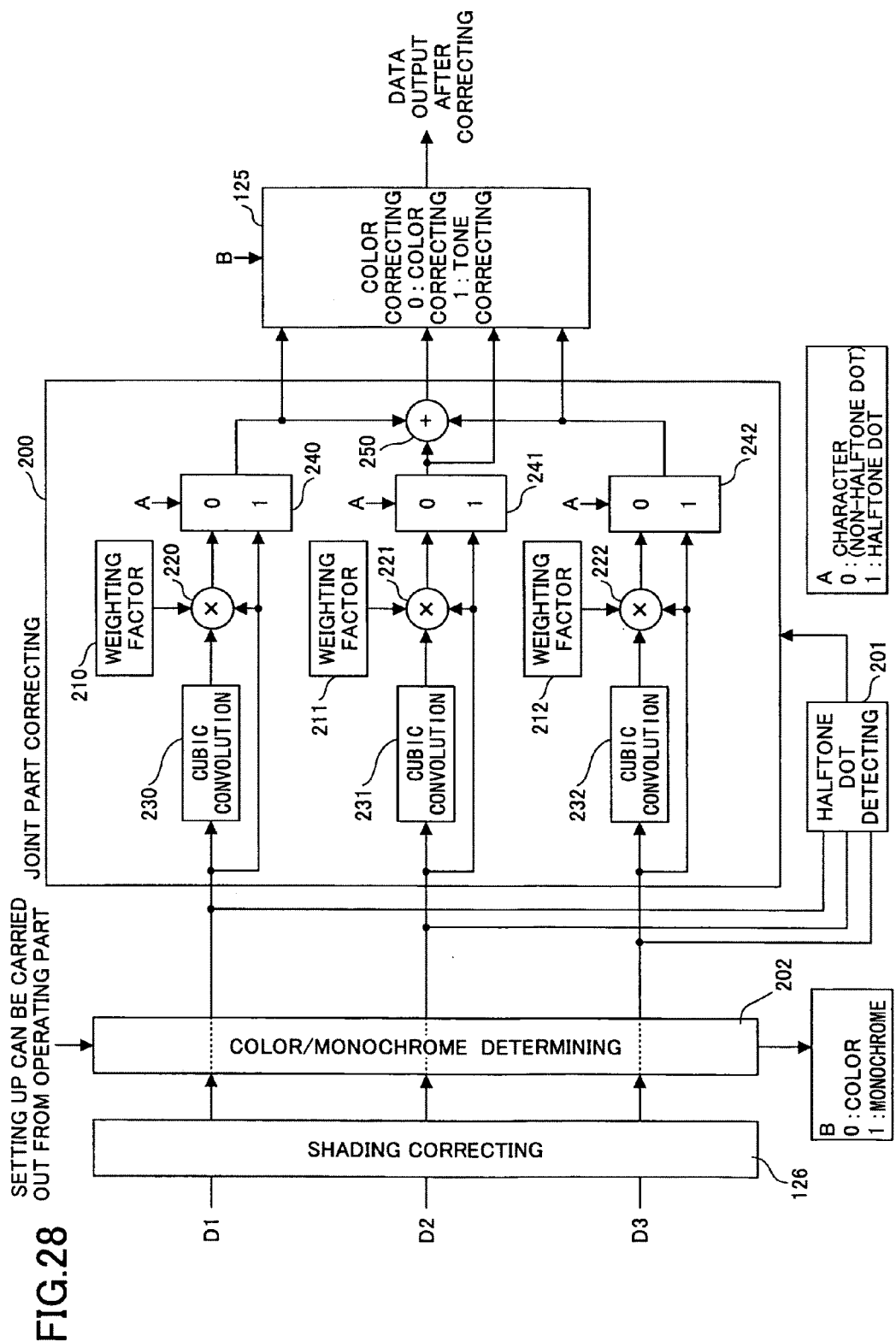
FIG. 28 depicts a detailed block diagram of a line combining part.

FIG. 28 is a block diagram depicting details of the line combining part 120.

As depicted in FIG. 28, the line combining part 120 includes a shading correcting part 126, a color/monochrome determining part 202, and a joint part correcting circuit 200.

Image data having passed through the shading correcting part 126 and the color/monochrome determining part 202 is then transferred to the joint part correcting circuit 200. The joint part correcting circuit 200 has the same configuration as that of the joint part correcting circuit 200 in the embodiment 1, and has the same function as that of the joint part correcting circuit 200 in the embodiment 1. The embodiment 3 is different from the embodiment 1 in that, in the embodiment 3, the shading correcting part 126 is provided before the color/monochrome determining part 202.

The joint part correcting circuit 200 includes three cubic convolution parts 230, 231 and 232, three weighting factor parts 210, 211 and 212, three multiplying circuits 220, 221 and 222, and three selectors 240, 241 and 242. A halftone dot detecting circuit 201 is provided separately.

As depicted in FIG. 28, the cubic convolution part 230, the multiplying circuit 220 and the selector 240 are disposed in series. To the selector 240, an output of the first multiplying circuit 220 is input, and also, image data having bypassed the cubic convolution part 230 and the multiplying circuit 220 is input.

Therefore, the selector 240 selects any one of the image data output from the multiplying circuit 220 and the image data having bypassed the cubic convolution part 230 and the multiplying circuit 220. Further, to the multiplying circuit 220, image data output from the cubic convolution part 230, a weighting factor output from the weighting factor part 210, and image data having bypassed the cubic convolution part 230, are input.

As depicted in FIG. 28, an identical circuit configuration is also provided for each of the cubic convolution parts 231 and 232, in parallel to the above-described circuit of the cubic convolution part 230. To the three parallel circuits, image data D1, D2 and D3 of overlapped parts, provided by the image sensors 151, 152 and 153, are input, respectively.

Subsequent to the three selectors 240, 241 and 242, an adding circuit 250 is provided, by which, the same as in the embodiment 1 described above, image data of the overlapped parts between respective adjacent image sensors 151, 152 and 153 is added together for each pixel, and thus, corrected image data of the overlapped parts are obtained. The image data output from the adding circuit 250 is then input to a color correcting part 125. Also, image data not yet being added by the adding circuit 250 is also input to the color correcting part 125. Further, image data of the overlapped parts is directly input to the color correcting part 125 from input terminals of the joint part correcting circuit 200. Thus, image data of the overlapped parts is extracted at three different stages, i.e., directly from the input terminals of the joint part correcting circuit 200, directly from input terminals of the adding circuit 250, and from output terminals of the adding circuit 250, and then is input to the color correcting part 125, the same as in each of the embodiments 1 and 2.

Image data of the overlapped parts thus having undergone a color correcting process carried out by the color correcting part 125 is then transferred to the line creating part 123. Further, to the halftone dot detecting circuit 201 provided other than the joint part correcting circuit 200, the image data of the overlapped parts of the image sensors 151, 152 and 153 is input. The halftone dot detecting circuit 201 determines whether the input image data is of a halftone dot area or a non-halftone dot area (i.e., a character image area or such). Based on the determination result of the halftone dot detecting circuit 201, image data to be selected by the selectors 240, 241 and 242 is determined.

In the line combining part 120 configured as described above, the image data D1, D2 and D3 of the overlapped parts between the image sensors 151, 152 and 153 first undergoes a shading correcting process carried out by the shading correcting part 126, then is determined by the color/monochrome determining part 202, and, is then input to the joint part correcting circuit 200 simultaneously. In the joint part correcting circuit 200, the image data D1, D2 and D3 are processed through paths determined based on a determining result A (halftone dot area or non-halftone dot area) by the halftone dot detecting circuit 201.

A determination as to whether image data is of a color image or of a monochrome image may be set also by user's setting operation carried out on an operating part 115. When such setting operation is carried out by a user on the operating part 115, the color/monochrome determining part 202 is bypassed. Further, the same as in the above-mentioned respective embodiments 1 and 2, a determination result as to whether image data is of a color image or of a monochrome image is reflected on a process carried out by the color correcting part 125. A configuration may be provided such that, when a determination result A of the halftone dot detecting circuit 201 is that image data is of a non-halftone dot area (i.e., a character area or such) "0", a process carried out by the joint part correcting circuit 200 is selected, whereas, when a determining result A of the halftone dot detecting circuit 201 is that image data is of a halftone dot area "1", the joint part correcting circuit 200 is substantially bypassed.

Details of functions of the cubic convolution parts 230, 231 and 232 and the weighting factor parts 210, 211 and 212 are the same as those in the above-mentioned embodiments 1 and 2, and duplicate description thereof will be omitted. In the embodiment 3, image data after undergoing a shading correcting process is determined, and, when the determination result is that the image data is of a non-halftone dot area, i.e., a character image area or such, values of expected pixels are calculated for the overlapped parts according to the cubic convolution method, arbitrary weighting factors are selected by the weighting factor parts 210, 211 and 212 and are used to multiply the image data, and a color correcting process is carried out by the color correcting part 125 according to a determination result as to whether the image data is of a color image or of a monochrome image. After that, the line creating part 123 creates a complete line of image data.

On the other hand, when image data is of a halftone dot area, it may be determined, for each line, whether a correcting process is carried out for the overlapped parts or the correcting process is bypassed, then, an adding process is carried out by the adding circuit 250, and corrected image data is obtained.

<Embodiment 4>

An embodiment 4 will now be described.

The embodiment 4 has approximately the same configuration as that of the above-mentioned embodiment 2. For the same configurations as those of the embodiment 2, duplicate description will be appropriately omitted.

Figure 29:
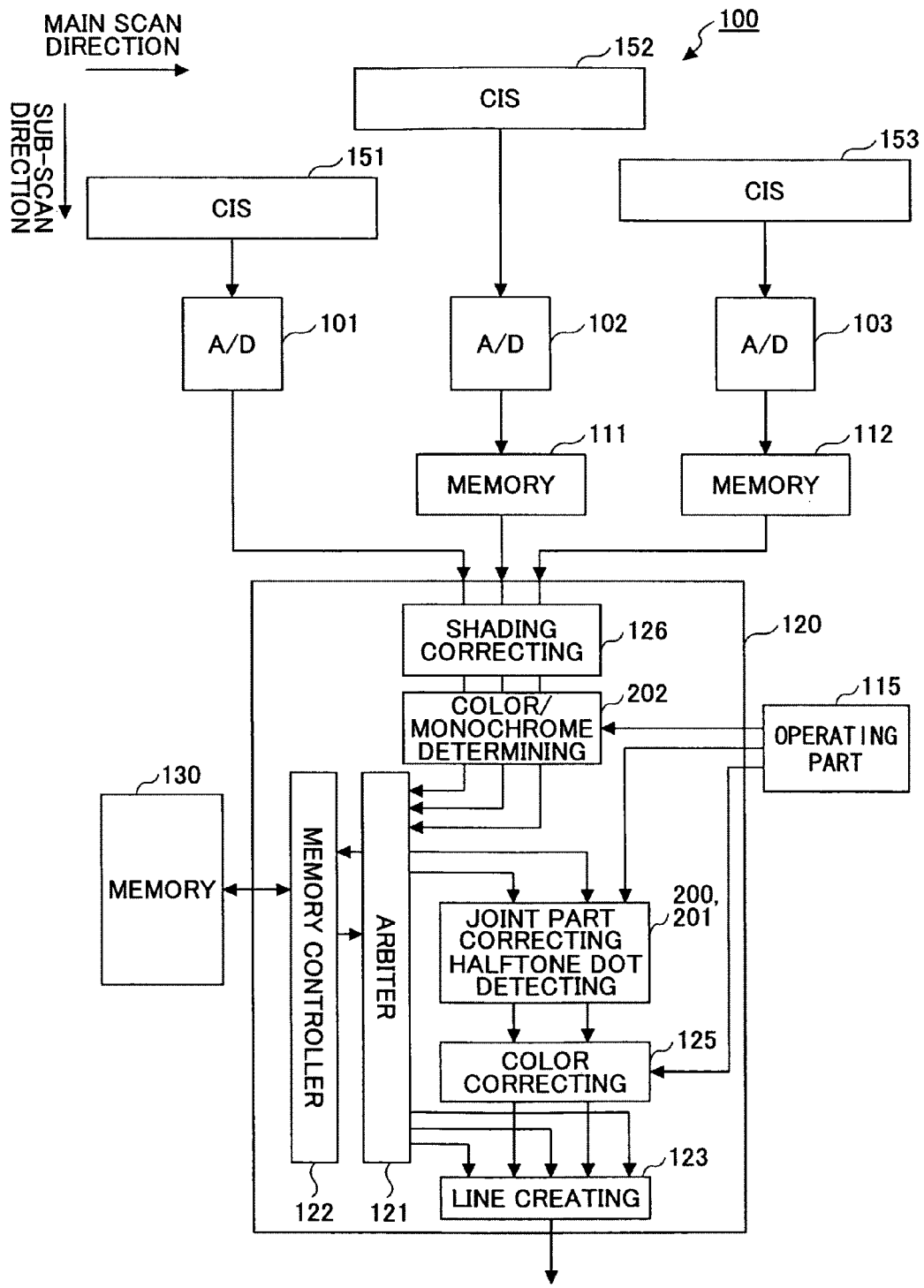
FIG. 29 depicts a rough block diagram of an image reading apparatus in an embodiment 4.

FIG. 29 is a block diagram roughly depicting an image reading apparatus in the embodiment 4.

This image reading apparatus 100 is such that, an arbiter 121 and a memory controller 122 are provided in the line combining part 120 in the embodiment 2. To a memory 130, the memory controller 122 is connected, and the memory controller 122 can communicate with the arbiter 121 in both directions.

To the arbiter 121, image data from an A/D converter 101 read by an image sensor 151, image data from a memory 111 read by an image sensor 152 and image data from a memory 112 read by an image sensor 153 are input, after having undergone a shading correcting process and a color/monochrome determination as to whether the image data is of a color image or of a monochrome image.

Functions of the arbiter 121, the memory controller 122 and the memory 130 are the same as those of the arbiter 121, the memory controller 122 and the memory 130 in the embodiment 2 described above with reference to FIG. 15.

From the arbiter 121, the read image data stored in the memory 130 is output to the joint part correcting circuit 200, the halftone dot detecting circuit 201, the color correcting part 125 and the line creating part 123.

That is, the read image data read by the respective image sensors 151, 152 and 153 is input to the line combining part simultaneously, and then, after undergoing a shading correcting process and a color/monochrome determination as to whether the image data is of a color image or of a monochrome image, is temporarily stored in the memory 130 via the arbiter 121. After that, for the purpose of creating a complete line of image data, the image data other than the image data of the overlapped parts is transmitted to the line creating part 123, and the image data of the overlapped parts is transmitted to the joint part correcting circuit 200.

Figure 30:
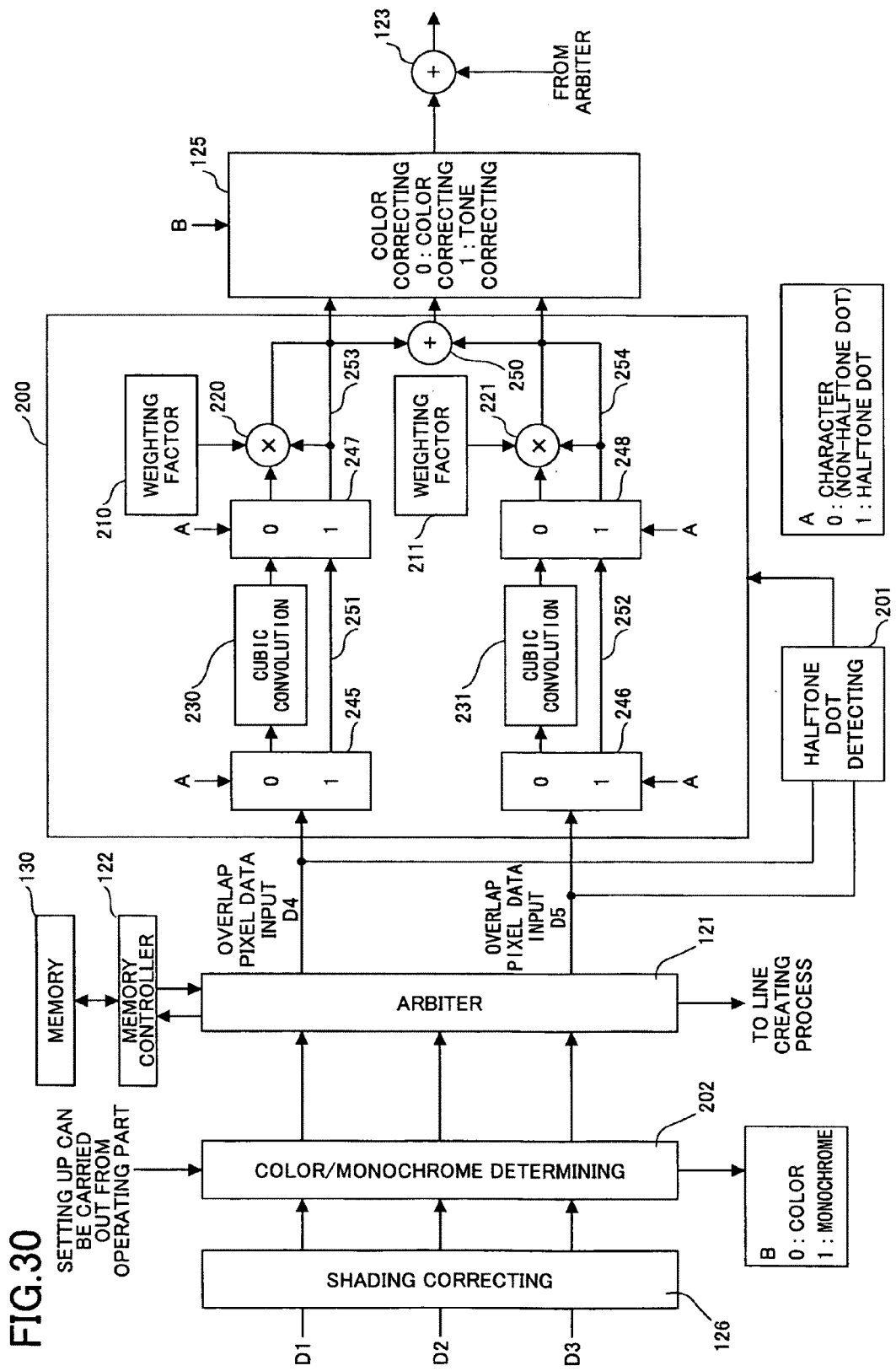
FIG. 30 depicts a detailed block diagram of a joint part correcting circuit of a line combining part.

FIG. 30 is a block diagram depicting details of the joint part correcting circuit 200 and the halftone dot detecting circuit 201 in the line combining part 120.

As depicted in FIG. 30, the joint part correcting circuit 200 includes two cubic convolution parts 230 and 231, two weighting factor parts 210 and 211, two multiplying circuits 220 and 221, two selectors 245 and 246 provided before the two cubic convolution parts 230 and 231, and two selectors 247 and 248 provided between the two cubic convolution parts 230 and 231 and the two multiplying circuits 220 and 221.

Further, in parallel to the two cubic convolution parts 230 and 231, two bypass circuits 251 and 252 are provided. Furthermore, in parallel to the two weighting factor parts 210 and 211, two bypass circuits 253 and 254 are provided. Outputs of the two multiplying circuits 220 and 221 are added together by an adding circuit 250. As a result, the same as in the embodiment 2 described above, corrected image data of the overlapped parts between the image sensors 151 and 152 or corrected image data of the overlapped parts between the image sensors 152 and 153 is obtained. The thus-obtained image data then undergoes a color correcting process by the color correcting part 125, in the same method as that in the embodiment 2.

To the selectors 245 and 246, image data D4 and D5 of the overlapped parts between the image sensors 151 and 152 or the overlapped parts between the image sensors 152 and 153 are input.

The image data D4 and D5 is also input to the halftone dot detecting circuit 201, which determines whether the image data D4 and D5 is of a halftone dot area or of a non-halftone dot area. Based on the determination result, the selectors 245, 246, 247 and 248 select paths in the joint part correcting circuit 200 through which the image data is to be processed.

In the joint part correcting circuit 200 and the halftone dot detecting circuit 201, the paths through which the image data D4 and D5 of the overlapped parts is to be processed are determined according to a determination result A of the halftone dot detecting circuit 201. That is, when it is determined that the image data D4 and D5 is of a non-halftone dot area (i.e., a character image area or such), the determining result A becomes "0". As a result, in the respective selectors 245, 246, 247 and 248, the paths of "0" are selected. As a result, a joint part correcting process is carried out on the image data D4 and D5 by the joint part correcting circuit 200. In the joint part correcting process, as in the respective embodiments described above, values of expected pixels are calculated according to the cubic convolution method, weighting factors are multiplied, a color correcting process is carried out by the color correcting part 125, and then, the line creating part 123 creates a complete line of image data.

The above-mentioned determination in the halftone dot detecting circuit 201 may be carried out for each line. When the determining result A is that image data is of a non-halftone dot area (i.e., a character area or such) "0", the joint part correcting process is carried out. Further, when the determining result A is that image data is of a halftone dot area "1", the joint part correcting process may be bypassed.

However, it is also possible that, regardless of the determination result of the halftone dot detecting circuit 201, the selecting operation carried out by the selectors 245, 246, 247 and 248 is determined as to whether the joint part correcting process is carried out, according to setting operation carried out by a user on an operating part 115. The cubic convolution method and the method of selecting weighting factors and multiplying the same are the same as those in the embodiment 2 described above.

Thus, in the embodiment 4, when given image data of the overlapped parts is of a non-halftone dot area (i.e., a character image area or such), the cubic convolution method is used to calculate values of expected pixels, arbitrary weighting factors are selected to multiply the image data, and then, the adding process is carried out to add the image data of the overlapped parts of the adjacent image sensors together. A configuration may be provided such that, when given image data is of a halftone dot area, for each line, it is determined whether the joint part correcting process is carried out or the joint part correcting process is omitted, and after that, the adding process is carried out to obtain corrected image data.

<Advantages>

According to the embodiments described above, the following advantages may be obtained:

1) image data of overlapped parts between respective image sensors is obtained, correction is carried out on the image data when a position of the image sensor shifts, with the use of correcting coefficients selected according to an amount of the above-mentioned shift of the position of the image sensor. Further, weighting factors selected according to a position in a main scan direction in the image sensor is used to multiply with. Then, the image data of the overlapped parts of both of the adjacent image sensors is added together. Thus, it is possible that an influence of the overlapped parts can be made inconspicuous.

2) In the joint part correcting process, it is possible to reduce a change in color, and thus, it is possible to obtain image data more close to an original image.

3) By selecting the correcting coefficients and the weighting factors, it is possible to carry out the correcting process suitable to an intended purpose.

4) It is determined whether image data of overlapped parts is of a halftone dot area or of a non-halftone dot area. In this case, a halftone dot determining target area can be arbitrarily set. Further, in a case of a halftone dot area, it is possible that, lines for which a joint part correcting process is carried out and lines for which the joint part correcting process is not carried out, may be combined. Therefore, even for a case where a halftone dot area corresponds to overlapped parts, tone reduction, faint/patchy phenomenon, or disappearance of an image part, can be avoided.

5) By arbitrarily setting lines for which a joint part correcting process is carried out and lines for which the joint part correcting process is not carried out, it is possible to carry out the correcting process suitable to an intended purpose.

6) By reducing the number of pixels for which a joint part correcting process is carried out when image data is determined as being of a halftone dot area, it is possible to carry out the joint part correcting process for the halftone dot area optimum to an intended purpose.

7) A determination as to whether image data is of a halftone dot area may be carried out for each line, a joint part correcting process may not be carried out on the image data determined as a halftone dot area, and the joint part correcting process may be carried out only on the image data determined as a non-halftone dot area. Thereby, it is possible to avoid disappearance of an image part even when a halftone dot area corresponds to the overlapped parts.

8) A determination as to whether image data is of a halftone dot area may be carried out for each line, a joint part correcting process may be carried out on the image data determined as a non-halftone dot area, and the joint part correcting process may be carried out on the image data determined as a halftone dot area with the number of pixels to undergo the joint part correcting process being reduced. Thereby, it is possible to carry out the correcting process suitable to an intended purpose.

<Embodiment 5>

An embodiment 5 will now be described. In the embodiment 5, in order to cause a computer to carry out the function of the line combining part 120 of each of the above-mentioned embodiments 1-4, an image data processing program is executed by the computer.

Figure 31:
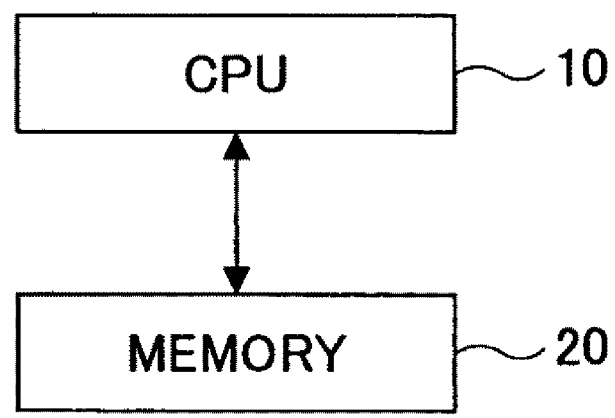
FIG. 31 depicts a block diagram for a case where a computer is used to realize a line combining part.

In the embodiment 5, as depicted in FIG. 31, the line combining part 120 is embodied by a computer including a CPU 10 and a memory 20. In the embodiment 5, a process carried out by each part included in the line combining part 120 is carried out as a result of, the program prepared for causing the computer to carry out the process being stored in the memory 20, the CPU 10 reading the program from the memory 20, and the CPU 10 executing the program.

That is, the program is prepared for causing the computer to act as the joint part correcting part for correcting for a part at which adjacent image sensors are overlapped each other in the image reading apparatus which includes the reading part in which the adjacent image sensors are arranged in a staggering manner with the adjacent image sensors being overlapped by a predetermined number of pixels in the main scan direction and an obtaining part configured to obtain image data in the overlapped parts of the respective adjacent image sensors. The joint part correcting part includes (a) a first part by which, when a position shift occurs in the image sensor, correcting coefficients according to an amount of the position shift are used to multiply the image data thus obtained by the obtaining part. Thereby, values of expected pixels are calculated by the first part. The joint part correcting part further includes (b) a second part by which, then weighting factors according to positions of respective pixels in the main scan direction of the adjacent image sensors are used to multiply the corrected image data obtained by the first part. The joint part correcting part further includes (c) a third part by which, the corrected image data thus obtained by the second part is added together between the adjacent image sensors. Thereby, image data in the overlapped parts is obtained. The joint part correcting part further may include (d) a fourth part by which, it is determined whether the image data thus read by means of the reading part is of a color image or of a monochrome image. The forth part may be provided separately from the joint part correcting part.

As the above-mentioned computer, for example, a general purpose computer such as a personal computer, a work station, or such, may be used. However, the embodiment 5 is not limited thereto.

Thereby, merely by preparing a computer environment by which the image data processing program in the embodiment 5 can be executed, it is possible to realize the image reading apparatus in any one of the embodiment 1-4, and the image forming apparatus.

The image data processing program in the embodiment 5 is used in a condition such that it is stored in a computer readable information recording medium, such as, for example, a CD-ROM (Compact Disk Read Only Memory), a flexible disk (FD), a CD-R (CD Readable), a DVD (Digital Versatile Disk), an HDD (Hard Disk Drive), a semiconductor memory such as a flash memory, a RAM (Random Access Memory), a ROM (Read Only Memory), FeRAM (Ferroelectric RAM), or such.

<Simulation Result>

Figure 32:
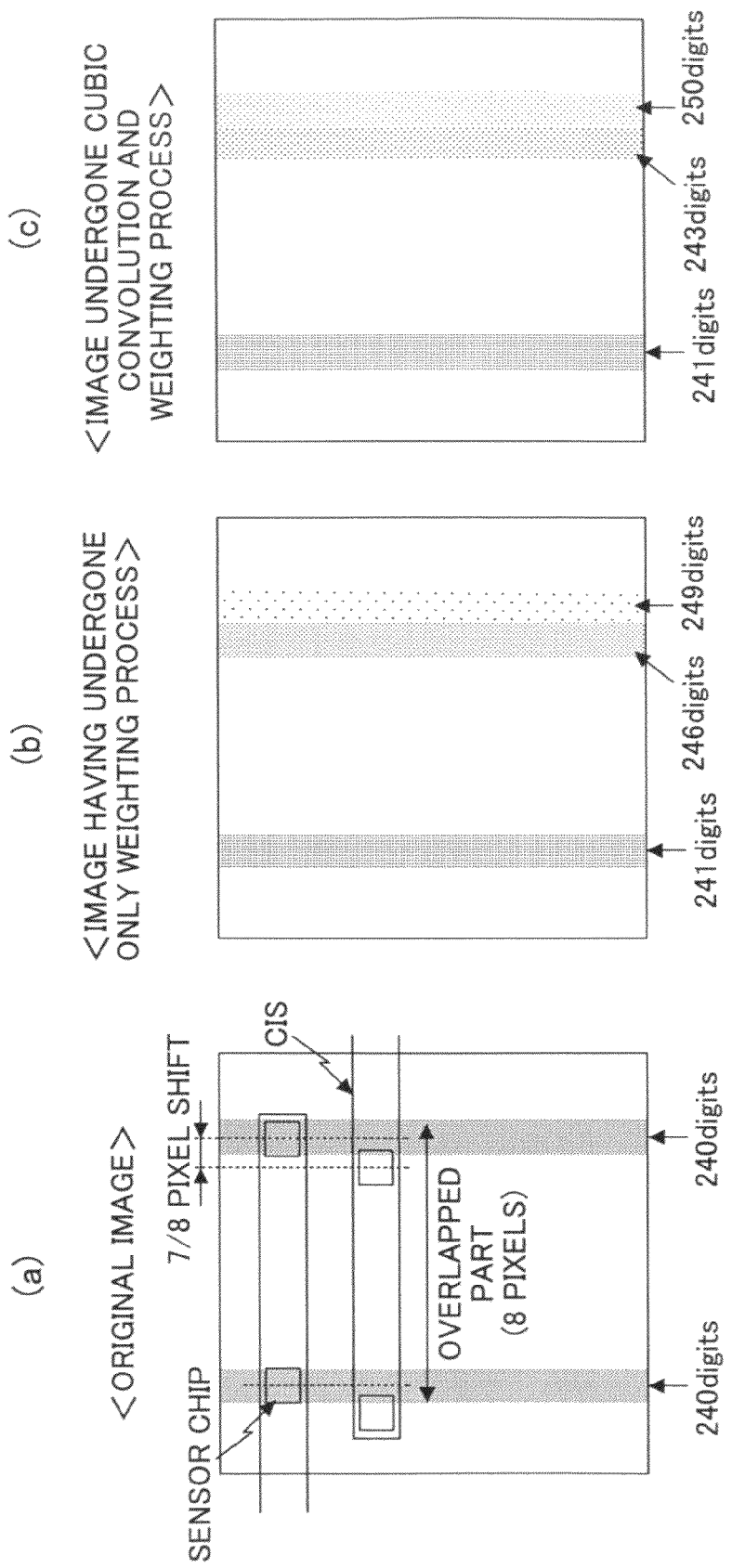
FIG. 32 depicts a simulation result for illustrating an advantage of each embodiment.

FIG. 32 depicts a simulation result illustrating an advantage of each embodiment described above.

FIG. 32, (a) depicts an original image from which the image reading apparatus in each of the embodiments 1-5 reads, and (b) depicts image data obtained as a result of stepwise weighting factors being multiplied by the multiplying circuits in the above-mentioned joint part correcting process and (c) depicts image data obtained as a result of both, values of expected pixels being calculated by the cubic convolution parts and stepwise weighting factors being multiplied by the multiplying circuits in the above-mentioned joint part correcting process.

The above-mentioned original image is such that, in an area of 12 pixels by 12 pixels, two drawn lines are drawn, each having a pixel value of 240 [digits] and a line width of one pixel. The other part than the two drawn lines, i.e., a background part, has a pixel value of 255 [digits]. Pixels of each of the overlapped parts of the adjacent image sensors which read the original image correspond to, in FIG. 32, (a), central 8 pixels. In this simulation, a position shift of 7/8 pixel occurs in the image sensor.

In the case of FIG. 32, (b), that is, only the process of multiplying stepwise weighting factors by the multiplying circuits is carried out in the above-mentioned joint part correcting process, and as a result, as depicted, read image data from the left drawn line of the above-mentioned two drawn lines has a pixel value of 241 [digits] (i.e., a tone difference from the original pixel value of 240 is 1 [digit]) and read image data from the right drawn line has a pixel value of 246 [pixels] (i.e., a tone difference from the original pixel value of 240 is 6 [digits]). On the other hand, in the case of FIG. 32, (c), that is, both process of calculating values of expected pixels by the cubic convolution parts and process of multiplying stepwise weighting factors by the multiplying circuits are carried out in the above-mentioned joint part correcting process, and as a result, as depicted, read image data from the left drawn line of the above-mentioned two drawn lines has a pixel value of 241 [digits] (i.e., a tone difference from the original pixel value of 240 is 1 [digit]) and read image data from the right drawn line has a pixel value of 243 [pixels] (i.e., a tone difference from the original pixel value of 240 is 3 [digits]). Therefore, the image data obtained as a result of both, values of expected pixels being calculated by the cubic convolution parts and stepwise weighting factors being multiplied by the multiplying circuits in the above-mentioned joint part correcting process, i.e., the case of FIG. 32, (c), the read image data from the right drawn line has the pixel value closer to the original pixel value by the amount of 3 [digits]. That is, it was possible to obtain the read image data having the pixel value closer to the original pixel value by carrying out of both process of calculating values of expected pixels by the cubic convolution parts and process of multiplying stepwise weighting factors by the multiplying circuits in the above-mentioned joint part correcting process, in comparison to the case where only the process of multiplying stepwise weighting factors by the multiplying circuits was carried out.

The present invention is not limited to the specifically disclosed embodiments, and variations and modifications may be made without departing from the scope of the present invention.

The present application is based on Japanese priority applications Nos. 2007-289992 and 2008-282104 filed Nov. 7, 2007 and Oct. 31, 2008, respectively, the entire contents of which are hereby incorporated herein by reference.

What is claimed is:

1. An image forming apparatus comprising:
 an image reading part having image sensors disposed in such a manner that reading parts of adjacent ones of the image sensors overlap in a main scan direction each other by a predetermined number of pixels in a staggering manner; and
 a joint part correcting part configured to correct image data obtained from the reading parts of the image sensors in a range in which the reading parts of the adjacent image sensors overlap in the main scan direction, wherein:
 the joint part correcting part comprises a first part configured to calculate corrected image data for each pixel in the range in which the reading parts of the adjacent image sensors overlaps in the main scan direction, for correcting the image data for a position shift less than an amount corresponding to one pixel in the main scan direction of the image sensor, wherein a correcting method is determined in such a manner that a position shift amount to be corrected increases in a step-by-step manner as a position moves from a base portion to an end portion in the range in which the adjacent image sensors overlap in the main scan direction;
 a second part configured to multiply the image data corrected by the thus-determined correcting method by a weighting factor which is determined according to a position in the main scan direction in the adjacent image sensors; and
 a third part configured to add the image data obtained from the first part and the second part, together between the adjacent image sensors for each corresponding pixel to generate image data of the range in which the adjacent image sensors overlap in the main scan direction.

2. The image reading apparatus as claimed in claim 1, further comprising:
 a fourth part configured to adopt the image data obtained from any one of the adjacent image sensors, before being processed by the first through third parts, instead of the image data having been processed by the first through third parts, in a case where color expressed by the image data changes by more than a predetermined amount when the image data processed by the first and the second parts is compared with the image data before being processed by the first and the second parts.

3. The image reading apparatus as claimed in claim 1, further comprising:
 a fifth part configured to carry out shading correction on the image data; and
 a sixth part configured to adopt the image data obtained from any one of the adjacent image sensors having been processed by the fifth part but before being processed by the first through third parts, instead of the image data having been processed by the fifth part and the first through third parts, in a case where color expressed by the image data changes by more than a predetermined amount when the image data having been processed by the fifth part and the first and the second parts is compared with the image data having been processed by the fifth part but before being processed by the first and the second parts.

4. The image reading apparatus as claimed in claim 1, further comprising:
 a seventh part configured to determine whether the image data corresponds to a halftone dot image, wherein:
 a selection is available to select a process in which the image data of the range in which the reading parts of the adjacent image sensors overlap in the main scan direction determined as corresponding to a halftone dot image by the seventh part is not processed by the first and second parts, and is added together between the adjacent image sensors by the third part for each pixel to generate image data of the range in which the reading parts of the adjacent image sensors overlap in the main scan direction.

5. The image reading apparatus as claimed in claim 1, further comprising:
an eighth part configured to determine whether the image data corresponds to a color image or a monochrome image, wherein:
a selection is available to select a process in which the image data of the range in which the reading parts of the adjacent image sensors overlap in the main scan direction determined as corresponding to a monochrome image by the eighth part is not processed by the first and second parts, and is added together between the adjacent image sensors by the third part for each pixel to generate image data of the range in which the reading parts of the adjacent image sensors overlap in the main scan direction.

6. The image reading apparatus as claimed in claim 1, further comprising:
an eighth part configured to determine whether the image data corresponds to a color image or a monochrome image; and
a ninth part configured to adopt, for the image data determined by the eighth part as corresponding to a monochrome image, the image data obtained from any one of the adjacent image sensors having been processed by the fifth part but before being processed by the first through third parts, instead of the image data having been processed by the fifth part and the first through third parts, in a case where the image data changes by more than a predetermined amount when the image data having been processed by the fifth part and the first and the second parts is compared with the image data having been processed by the fifth part but before being processed by the first and the second parts.

7. The image reading apparatus as claimed in claim 1, further comprising a tenth part configured for a user to designate the correcting method.

8. The image reading apparatus as claimed in claim 1, further comprising an eleventh part configured to select the weighting factor.

9. The image reading apparatus as claimed in claim 1, further comprising:
a twelfth part configured to determine whether the image data corresponds to a halftone dot image for each line, wherein:
the image data on the line determined as corresponding to a halftone dot image by the twelfth part in the range in which the reading parts of the adjacent image sensors overlap in the main scan direction is not processed by the first and second parts, and is added together between the adjacent image sensors by the third part for each pixel to generate image data of the range in which the reading parts of the adjacent image sensors overlap in the main scan direction.

10. The image reading apparatus as claimed in claim 1, further comprising:
a twelfth part configured to determine whether the image data corresponds to a halftone dot image for each line, wherein:
for the image data on the line determined as corresponding to a halftone dot image by the twelfth part in the range in which the reading parts of the adjacent image sensors overlap in the main scan direction, the number of pixels to be processed by the joint part correcting part is reduced.

11. An image forming apparatus comprising:
the image reading apparatus claimed in claim 1; and
an image forming unit configured to form an image corresponding to the image data obtained by the image reading apparatus.

12. A non-transitory computer readable information recording medium tangibly embodying an image data processing program which, when executed by a computer processor, performs an image data processing method used by an image reading apparatus, which comprises an image reading part having image sensors disposed in such a manner that reading parts of adjacent ones of the image sensor overlap in a main scan direction each other by a predetermined number of pixels in a staggering manner, said image processing method comprises:
a joint part correcting step of correcting image data obtained from the reading parts of the image sensors in a range in which the reading parts of the adjacent image sensors overlap in the main scan direction, wherein:
the joint part correcting step comprises a first step of calculating corrected image data for each pixel in the range in which the reading parts of the adjacent image sensors overlaps in the main scan direction, for correcting the image data for a position shift less than an amount corresponding to one pixel in the main scan direction of the image sensor, wherein a correcting method is determined in such a manner that a position shift amount to be corrected increases in a step-by-step manner as a position moves from a base portion to an end portion in the range in which the adjacent image sensors overlap in the main scan direction;
a second step of multiplying the image data corrected by the thus-determined correcting method by a weighting factor which is determined according to a position in the main scan direction in the adjacent image sensors; and
a third step of adding the image data obtained from the first part and the second part, together between the adjacent image sensors for each corresponding pixel to generate image data of the range in which the adjacent image sensors overlap in the main scan direction.

* * * * *